US007901028B2

(12) United States Patent
Miyamoto

(10) Patent No.: US 7,901,028 B2
(45) Date of Patent: Mar. 8, 2011

(54) METHOD OF CALCULATING CORRECTION VALUE AND METHOD OF DISCHARGING LIQUID

(75) Inventor: Toru Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/383,814

(22) Filed: Mar. 27, 2009

(65) Prior Publication Data

US 2009/0244154 A1 Oct. 1, 2009

(30) Foreign Application Priority Data

Mar. 27, 2008 (JP) ................................ 2008-084702

(51) Int. Cl.
*B41J 29/393* (2006.01)
*B41J 2/205* (2006.01)
*G06K 15/02* (2006.01)

(52) U.S. Cl. .............................. 347/19; 347/15; 358/1.2

(58) Field of Classification Search .................... 347/15, 347/19, 14, 131, 188, 240, 251–254; 358/1.2, 358/1.9, 3.01, 3.03, 3.06
See application file for complete search history.

(56) References Cited

U.S. PATENT DOCUMENTS 6,390,583 B1 * 5/2002 Kato et al. ...................... 347/15

FOREIGN PATENT DOCUMENTS

JP 2006-305952 11/2006

* cited by examiner

*Primary Examiner* — Matthew Luu
*Assistant Examiner* — Lisa M Solomon
(74) *Attorney, Agent, or Firm* — Nutter McClennen & Fish LLP; John J. Penny, Jr.

(57) ABSTRACT

There is provided a method of calculating a correction value. The method includes forming a first test pattern on a medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group, and forming a second test pattern on the medium by using the second nozzle group and the third nozzle group of the liquid discharging device.

8 Claims, 22 Drawing Sheets

FIG. 19

| ROW AREA NUMBER | CYAN | | | | |
|---|---|---|---|---|---|
| | Sa | Sb | Sc | Sd | Se |
| 1 | Ha_1 | Hb_1 | Hc_1 | Hd_1 | He_1 |
| 2 | Ha_2 | Hb_2 | Hc_2 | Hd_2 | He_2 |
| 3 | Ha_3 | Hb_3 | Hc_3 | Hd_3 | He_3 |
| ⋮ | | | ⋮ | | |
| N−1 | Ha_N−1 | Hb_N−1 | Hc_N−1 | Hd_N−1 | He_N−1 |
| 180×n=N | Ha_N | Hb_N | Hc_N | Hd_N | He_N |

METHOD OF CALCULATING CORRECTION VALUE AND METHOD OF DISCHARGING LIQUID

BACKGROUND

1. Technical Field

The present invention relates to a method of calculating a correction value and a method of discharging liquid.

2. Related Art

As one type of liquid discharging devices, there are ink jet printers that perform a printing operation by discharging ink on various media such as a sheet, a cloth, or a film from a nozzle. Recently, as one type of the ink jet printers, line head printers having a nozzle row of a length corresponding to the sheet width in a predetermined direction intersecting a transport direction of a medium have been developed.

Non-uniformity of density may occur due to a problem such as precision of nozzle processing, landing of ink droplets in an inappropriate position on the medium, or a difference of ink discharging amounts. Thus, a correction value is calculated such that an image piece that is visually recognized thin is printed thick and an image piece that is visually recognized thick is printed thin. Accordingly, an actual test pattern is printed by the printer. Then, a method in which the test pattern is read out by the scanner, and a correction value is calculated based on the read-out result has been proposed (for example, JP-A-2006-305952).

In a printer having a long head, a long test pattern in a predetermined direction is printed. However, there is limit on the range in which the test pattern can be read out by the scanner. Accordingly, a test pattern that is printed by the printer having a long head cannot be read out by the scanner, and therefore, a correction value cannot be calculated.

Thus, a method of calculating a correction value of the printer having the long head is needed.

SUMMARY

An advantage of some aspects of the invention is that it provides a method of calculating a correction value and a method of discharging liquid.

According to a major aspect of the invention, there is provided a method of calculating a correction value. The method includes: forming a first test pattern on a medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group; forming a second test pattern on the medium by using the second nozzle group and the third nozzle group of the liquid discharging device; setting the first test pattern in a scanner, acquiring a read-out result of a portion formed by the first nozzle group from a read-out result of the first test pattern as a first read-out gray scale value, and acquiring a read-out result of a portion formed by the second nozzle group from a read-out result of the first test pattern as a second read-out gray scale value; setting the second test pattern other than the first test pattern in the scanner, acquiring a read-out result of a portion formed by the second nozzle group from a read-out result of the second test pattern as a third read-out gray scale value, and acquiring a read-out result of a portion formed by the third nozzle group from a read-out result of the second test pattern as a fourth read-out gray scale value; calculating an average gray scale value that is an average value of the second read-out gray scale value and the third read-out gray scale value; and calculating a correction value of the second nozzle group based on the average gray scale value.

Other aspects of an embodiment of the invention will be apparent by descriptions here and accompanying drawings.

BRIEF DESCRIPTION OF THE DRAWINGS

The invention will be described with reference to the accompanying drawings, wherein like numbers reference like elements.

FIG. 19 is a correction table.

DESCRIPTION OF EXEMPLARY EMBODIMENTS

Overview of Disclosure

Figure 1:
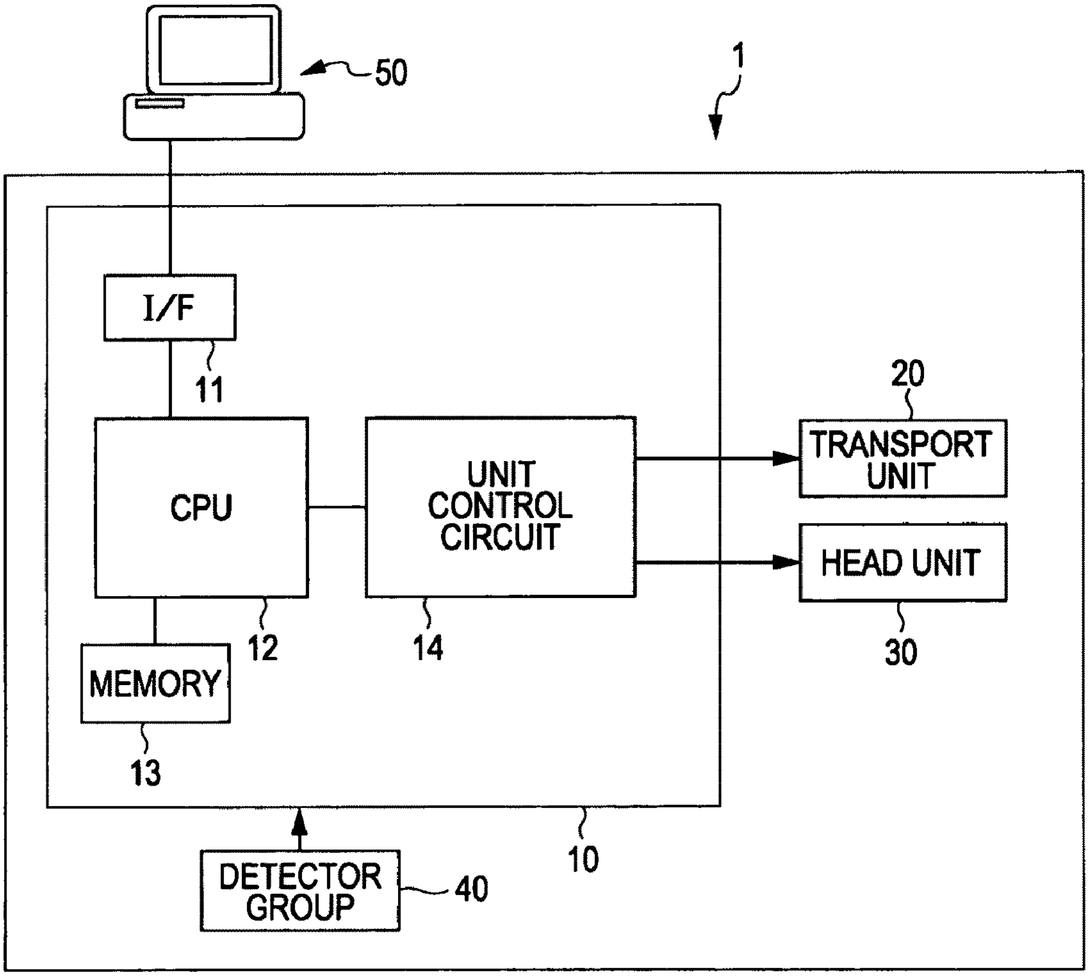
FIG. 1 is a block diagram showing the whole configuration of a printer according to this embodiment.

By descriptions here and description of the attached drawings, at least the followings become apparent.

According to a first aspect of the invention, there is provided a method of calculating a correction value. The method includes: forming a first test pattern on a medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group; forming a second test pattern on the medium by using the second nozzle group and the third nozzle group of the liquid discharging device; setting the first test pattern in a scanner, acquiring a read-out result of a portion formed by the first nozzle group from a read-out result of the first test pattern as a first read-out gray scale value, and acquiring a read-out result of a portion formed by the second nozzle group from a read-out result of the first test pattern as a second read-out gray scale value; setting the second test pattern other than the first test pattern in the scanner, acquiring a read-out result of a portion formed by the second nozzle group from a read-out result of the second test pattern as a third read-out gray scale value, and acquiring a read-out result of a portion formed by the third nozzle group from a read-out result of the second test pattern as a fourth read-out gray scale value; calculating an average gray scale value that is an average value of the second read-out gray scale value and the third read-out gray scale value; and calculating a correction value of the second nozzle group based on the average gray scale value.

According to the above-described method of calculating the correction value, for the read-out results of test patterns that are not simultaneously read out by the scanner, the read-out error of the scanner can be reduced, and thereby a correction value can be calculated more accurately.

In the above-described method, it may be configured that the first nozzle group, the second nozzle group, and the third nozzle group are aligned in the described order from one side in the predetermined direction, and, in the calculating of an average gray scale value, an average value of the second read-out gray scale value, from which the read-out result of the first test pattern formed by the nozzle of the second nozzle group that is located in an end portion on the other side is excluded, and the third read-out gray scale value, from which the read-out result of the second test pattern formed by the nozzle of the second nozzle group that is located in an end portion on the one side is excluded, is calculated as the average gray scale value.

In such a case, the read-out result of the first test pattern that is formed by a nozzle located in the end portion on the other side of the second nozzle group and the read-out result of the second test pattern formed by a nozzle located in the end portion on the one side of the second nozzle group may be influenced by the background color of the medium. Accordingly, by calculating the average gray scale value with such read-out results excluded, a more accurate correction value can be calculated.

In the above-described method, it may be configured that the first nozzle group, the second nozzle group, and the third nozzle group are aligned in the described order from one side in the predetermined direction, in the calculating of an average gray scale value, weighting factors are set such that as a nozzle of the second nozzle group is located closer to the end portion on the other side, a weighting factor for the read-out result of the first test pattern that is formed by the nozzle becomes larger and as a nozzle of the second nozzle group is located closer to the end portion on the one side, a weighting factor for the read-out result of the second test pattern that is formed by the nozzle becomes smaller, and an average value acquired by weighted-averaging the second read-out gray scale value and the third read-out gray scale value is calculated as the average gray scale value based on the weighting factors.

In such a case, the read-out result that may be influenced by the background color of the medium do not have any influence on the average gray scale value, and thereby a more accurate correction value can be calculated.

In the above-described method, it may be configured that the first nozzle group, the second nozzle group, and the third nozzle group are aligned in the described order from one side in the predetermined direction, the first test pattern is formed on the medium by using the first nozzle group, the second nozzle group, and the nozzle of the third nozzle group that is located in the end portion on one side, and the second test pattern is formed on the medium by using the nozzle of the first nozzle group that is located in the end portion on the other side, the second nozzle group, and the third nozzle group.

In such a case, a more accurate correction value can be calculated based on the read-out result that is not influenced by the background color of the medium.

In the above-described method, it may be configured that a plurality of the first read-out gray scale values and a plurality of the second read-out gray scale values are acquired by forming a plurality of the first test patterns, a plurality of the third read-out gray scale values and a plurality of the fourth read-out gray scale values are acquired by forming a plurality of the second test patterns, in the calculating of an average gray scale value, an average value of the plurality of the second read-out gray scale values and the plurality of the third read-out gray scale values is calculated as the average gray scale value; and, in the calculating of a correction value, the correction value of the first nozzle group is calculated based on the plurality of the first read-out gray scale values, the correction value of the second nozzle group is calculated based on the average gray scale value, and the correction value of the third nozzle group is calculated based on the plurality of the fourth gray scale values.

In such a case, the correction value is calculated based on the read-out results of the plurality of test patterns, and accordingly, the read-out error of the scanner can be reduced further. Therefore, an accurate correction value can be calculated.

In the above-described method, the first nozzle group, the second nozzle group, and the third nozzle group may be aligned in the described order from one side in the predetermined direction. In such a case, this method further includes forming a third test pattern on the medium by using the nozzle of the second nozzle group that is located on the other side and the third nozzle group. In addition, in the calculating of a correction value, the correction value of the first nozzle group is calculated based on the first read-out gray scale value, the correction value of the nozzle of the second nozzle group that is located on the one side other than the nozzle located on the other side is calculated based on the average gray scale value corresponding to the nozzle on the one side, and the correction value of the nozzle on the other side is calculated based on the average gray scale value corresponding to the other nozzle and the read-out result of the third test pattern corresponding to the other nozzle.

In such a case, the number of the read-out results can be gradually increased from the nozzle on the one side to nozzle located in the center portion in the predetermined direction, and accordingly, the degree of accuracy of the correction value can be increased from the one side to the center portion in the predetermined direction.

According to a second aspect of the invention, there is provided a method of discharging liquid. The method of discharging liquid includes: forming a first test pattern on a medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group; forming a second test pattern on the medium by using the second nozzle group and the third nozzle group of the liquid discharging device; setting the first test pattern in a scanner, acquiring a read-out result of a portion formed by the first nozzle group from a read-out result of the first test pattern as a first read-out gray scale value, and acquiring a read-out result of a portion formed by the second nozzle group from a read-out result of the first test pattern as a second read-out gray scale value; setting the second test pattern other than the first test pattern in the scanner, acquiring a read-out result of a portion formed by the second nozzle group from a read-out result of the second test pattern as a third read-out gray scale value, and acquiring a read-out result of a portion formed by the third nozzle group from a read-out result of the second test pattern as a fourth read-out gray scale value; calculating an average gray scale value that is an average value of the second read-out gray scale value and the third read-out gray scale value; calculating a correction value of the second nozzle group based on the average gray scale value; and correcting the gray scale value represented by image data by using the correction value and discharging liquid based on the corrected gray scale value by using the liquid discharging device.

According to the above-described method of discharging liquid, the gray scale value is corrected by using a correction value in which a read-out error of the scanner is decreased, and non-uniformity of liquid discharge can be prevented. For example, when the liquid discharging device is a printer, non-uniformity of density can be prevented.

According to a third aspect of the invention, there is provided a method of calculating a correction value. The method includes: forming a first test pattern having a first dot row group and a second dot row group on a medium by using a liquid discharging device that alternately repeats forming a dot row, in which dots are aligned in an intersection direction, with a nozzle row, in which a plurality of nozzles for discharging liquid is aligned in a predetermined direction, and the medium relatively moved in the intersection direction intersecting the predetermined direction and relatively moving the nozzle row and the medium in the predetermined direction; forming a second test pattern having a second dot row group and a third dot row group on the medium by using the liquid discharging device; setting the first test pattern in a scanner, acquiring a read-out result of the first dot row group as a first read-out gray scale value, and acquiring a read-out result of the second dot row group as a second read-out gray scale value; setting the second test pattern other than the first test pattern in the scanner, acquiring a read-out result of the second dot row group as a third read-out gray scale value, and acquiring a read-out result of the third dot row group as a fourth read-out gray scale value; calculating an average gray scale value that is an average value of the second read-out gray scale value and the third read-out gray scale value; and calculating a correction value of the second dot row group based on the average gray scale value.

According to the above-described method of calculating the correction value, the read-out error of the scanner can be reduced, and thereby a more accurate correction value can be calculated.

Line Head Printer

Hereinafter, an ink jet printer as a liquid discharging apparatus according to an embodiment of the invention, and more particularly, a line head printer (printer 1) as one type of the ink jet printer will be described as an example.

Figure 2A:
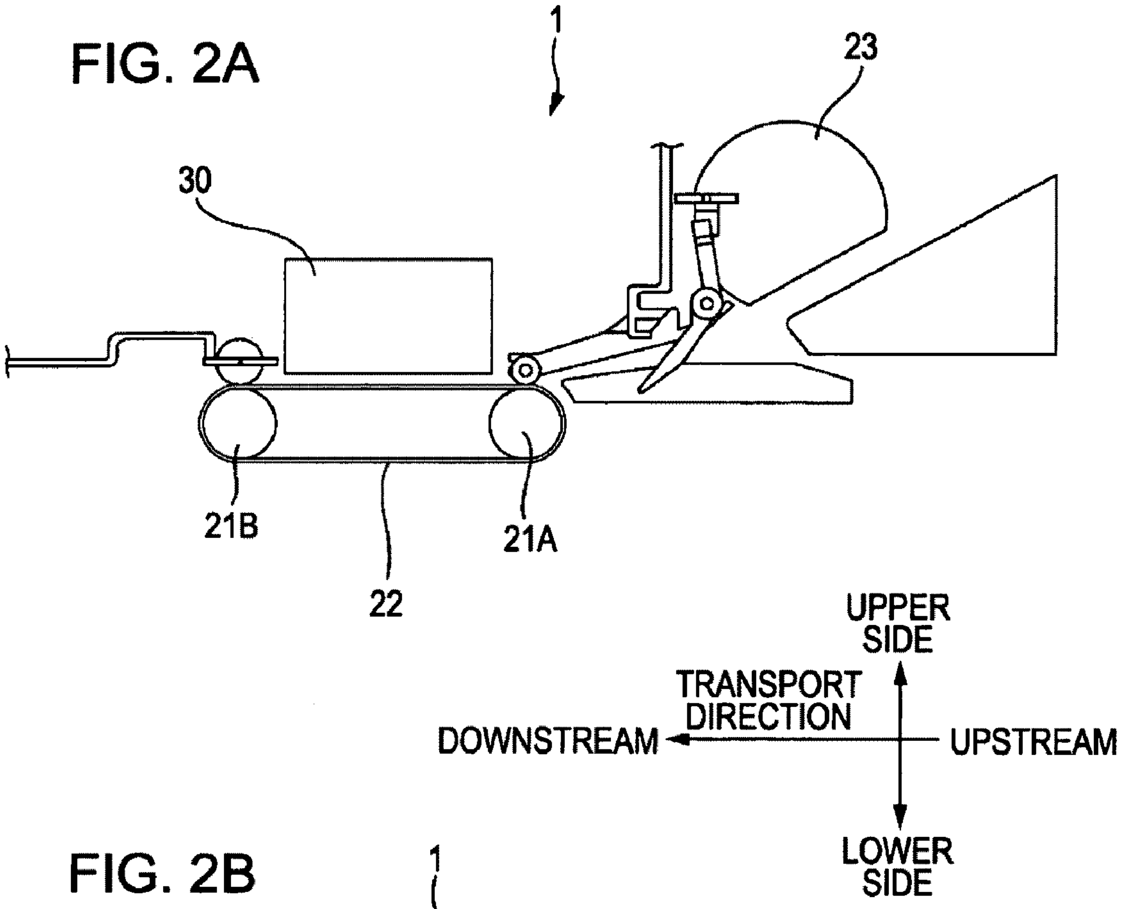
FIG. 2A is a cross-section view of the printer.
Figure 2B:
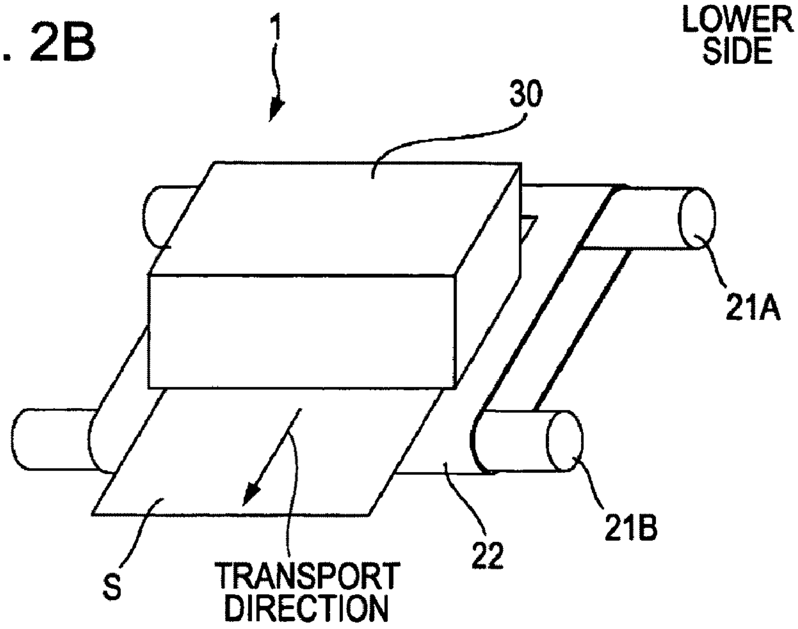
FIG. 2B is a diagram showing appearance of transporting a sheet in the printer.

FIG. 1 is a block diagram showing the whole configuration of a printer 1 according to this embodiment. FIG. 2A is a cross-section view of the printer 1. FIG. 2B is a diagram showing appearance of transporting a sheet S (medium) in the printer 1. The printer 1 that receives print data from a computer 50 as an external apparatus forms an image on a sheet S by controlling units (a transport unit 20 and a head unit 30) by using a controller 10. In addition, a detector group 40 monitors states of the inside of the printer 1, and the controller 10 controls the units based on the result of detection.

The controller 10 is a control unit that is used for performing a control operation for the printer 1. An interface unit 11 is used for transmitting and receiving data between the computer 50 as an external apparatus and the printer 1. A CPU 12 is an arithmetic processing device that is used for controlling the entire printer 1. A memory 13 is used for acquiring an area for storing a program of the CPU 12, a work area, and the like. The CPU 12 controls each unit based on the program that is stored in the memory 13 by using the unit control circuit 14.

A transport unit 20 includes transport rollers 21A and 21B and a transport belt 22. The transport unit 20 transports a sheet S to a printable position and transports the sheet S in the transport direction at a predetermined transport speed in a printing process. A feed roller 23 is a roller that is used for automatically feeding the sheet S that is inserted into a paper inserting port on the transport belt 22 inside the printer 1. The transport belt 22 having a ring shape is rotated by the transport rollers 21A and 21B, and whereby the sheet S on the transport belt 22 is transported. In addition, electrostatic adsorption or vacuum adsorption is performed for the sheet on the transport belt 22 from the lower side.

The head unit 30 is used for discharging ink on a sheet and includes a plurality of heads 31. On a lower face of the head 31, a plurality of nozzles as ink discharging units is disposed. In each nozzle, a pressure chamber (not shown) in which ink is inserted and a driving element (piezo element) that is used for discharging ink by changing the volume of the pressure chamber are disposed.

Figure 3:
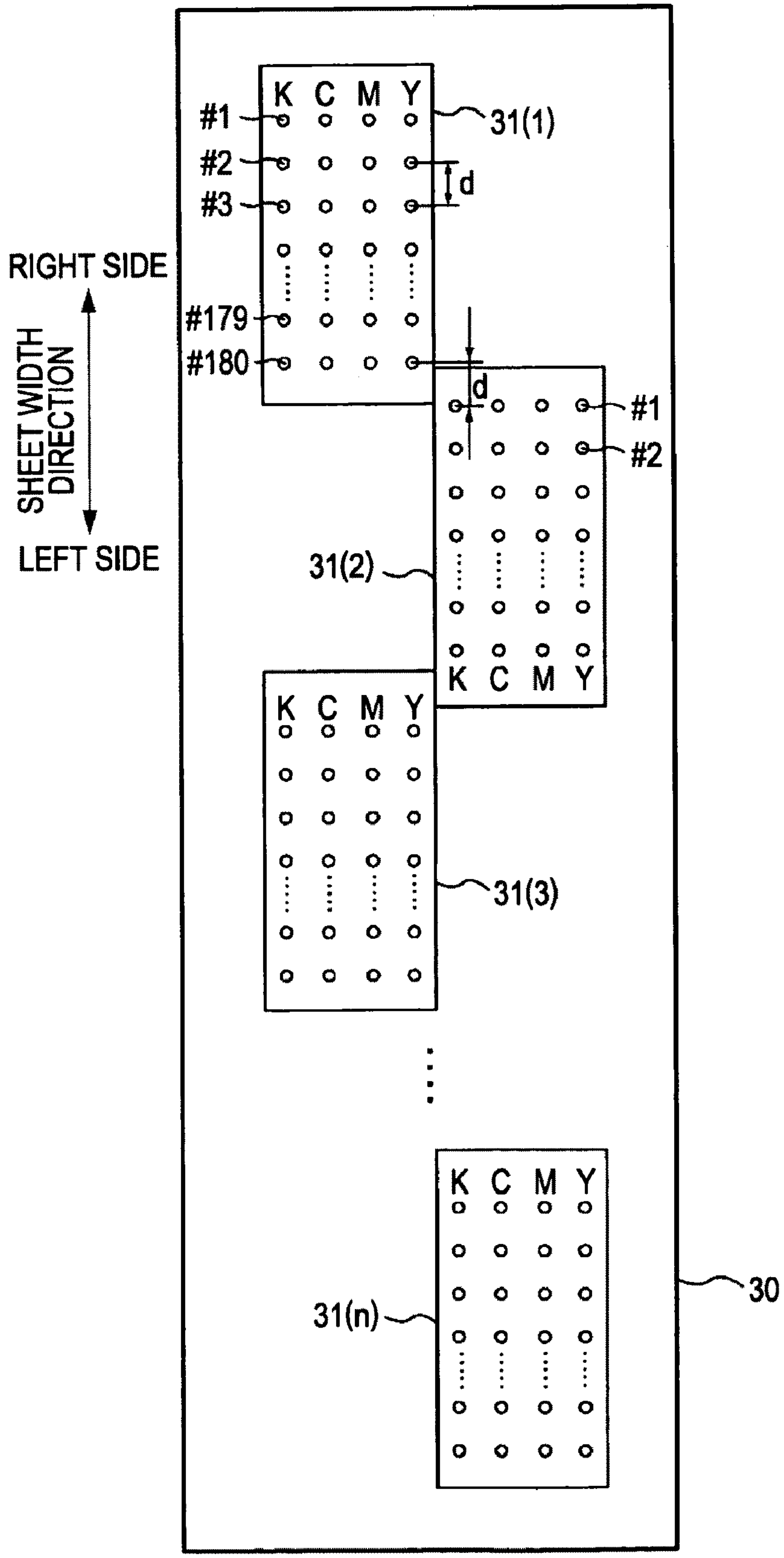
FIG. 3 shows a nozzle arrangement on a lower face of a head unit.

FIG. 3 shows a nozzle arrangement on the lower face of the head unit 30. The head unit 30 includes a plurality of (n) heads 31. From a head 31 located on the right side in the sheet width direction (corresponds to a predetermined direction), a first head 31(1), a second head 31(2), . . . , an n-th head **31(*n*) are sequentially disposed. The plurality of the heads 31 is disposed so as to be aligned in a zigzag pattern in the sheet width direction that intersects the transport direction. On the lower face of the head 31**, a yellow ink nozzle row Y, a magenta ink nozzle row M, a cyan ink nozzle row C, and a black ink nozzle row K are formed, and each nozzle row has 180 nozzles. The nozzles of each nozzle row are aligned in the sheet width direction with a predetermined distance d interposed therebetween.

In addition, the heads 31 are disposed such that a distance between the rightmost nozzle (for example, #1 of 31(2)) of the left head between two heads 31 aligned in the sheet width direction and the leftmost nozzle (for example, #180 of 31(1)) of the right head is a predetermined distance d. In other words, within the head unit 30, nozzles (YMCK) of four colors are aligned in the sheet width direction with a predetermined distance d interposed therebetween.

In such a line head printer, when the controller 10 receives print data, the controller 10, first, rotates the feed roller 23 so as to transmit a sheet S to be printed on the transport belt 22. The sheet S is transported on the transport belt 22 at a constant speed without stopping and passes below the head unit 30. While the sheet S passes below the head unit 30, ink is intermittently discharged from each nozzle. As a result, a dot row formed of a plurality of dots in the transport direction is formed on the sheet S, and whereby an image is printed.

Non-Uniformity of Density

For description below, a "pixel area" and a "row area" are defined here. The pixel area represents a rectangular area that is virtually determined on a sheet. The size and the shape of the pixel area are determined in accordance with the printing resolution. One "pixel" that configures image data corresponds to one pixel area. In addition, a "row area" is an area located on the sheet which is configured by a plurality of the pixel areas aligned in the transport direction. A "pixel row" of data in which pixels are aligned in a direction facing the transport direction corresponds to one row area.

Figure 4A:
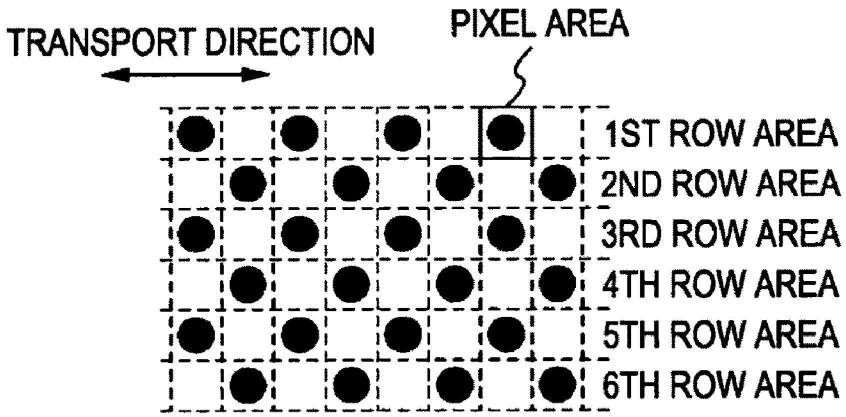
FIG. 4A is a diagram showing ideal dot formation.

FIG. 4A is an explanatory diagram showing appearance of a case where dots are formed ideally. To form a dot ideally means that an ink droplet lands in a center position of a pixel area, the ink droplet spreads on the sheet, and a dot is formed in a pixel area. When each dot is accurately formed in each pixel area, a raster line (a dot row in which dots are aligned in the transport direction) is formed accurately in a row area.

Figure 4B:
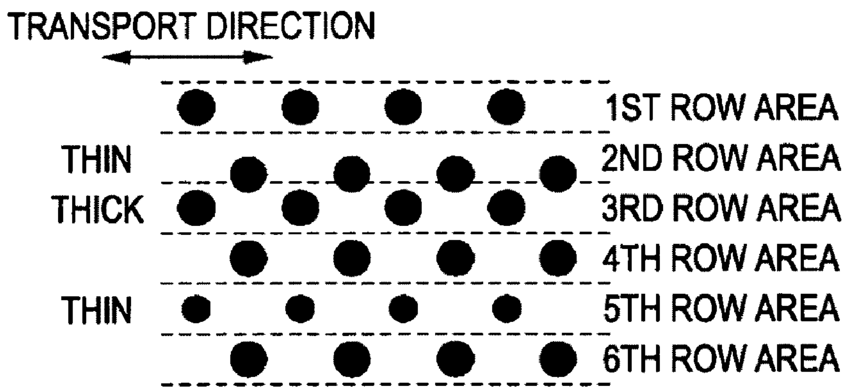
FIG. 4B is a diagram showing dot formation with non-uniformity of density.

FIG. 4B is an explanatory diagram of a case where non-uniformity of density occurs. A raster line that is formed in the second row area is formed to be brought near the third row area due to variation of the flying direction of ink droplets discharged from the nozzle. As a result, the second row area becomes thin, and the third row area becomes thick. In addition, the ink amount of ink droplets discharged to the fifth row area is smaller than a regulated ink amount, and accordingly, dots formed in the fifth row area are small. As a result, the fifth row area becomes thin.

When a printed image that is formed of raster lines having different density is viewed macroscopically, non-uniformity of density having a striped shape in the transport direction is visually recognized. This non-uniformity of density becomes a reason for degrading the image quality of the printed image.

Figure 4C:
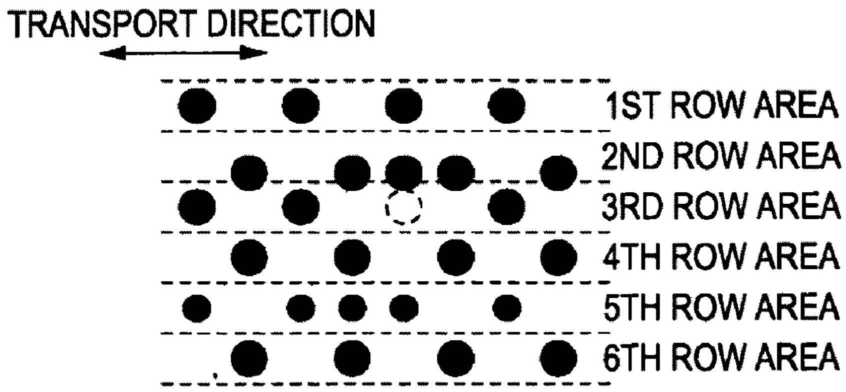
FIG. 4C is a diagram showing dot formation according to this embodiment.

FIG. 4C is an explanatory diagram showing appearance of a case where dots are formed by using a printing method according to this embodiment. According to this embodiment, for a row area that can be easily recognized to be thick, the gray scale values of pixels corresponding to the row area are corrected so as to form a thin image piece. On the other hand, for a row area that can be easily recognized to be thin, the gray scale values of pixels corresponding to the row area are corrected so as to form a thick image piece.

For example, in FIG. 4C, gray scale values of pixel data of pixels corresponding to each row area are corrected such that dot generation ratios of the second and the fifth row areas recognized to be thin is increased and the dot generation ratio of the third row area recognized to be thick is decreased. Accordingly, the dot generation ratio for the raster line of each row area is changed, and thereby the density of an image piece of a row area is corrected. Therefore, the density non-uniformity of the entire printed image is suppressed.

In FIG. 4B, the reason that the density of an image piece that is formed in the third row area becomes thick is not by the influence of a nozzle that forms the raster line in the third row area but by the influence of a nozzle that forms a raster line in the adjacent second row area. Accordingly, when the nozzle that forms the raster line in the third row area forms a raster line in a different row area, it cannot be determined that an image piece formed in the row area becomes thick. In other words, even for image pieces that are formed by a same nozzle, when a nozzle that forms an adjacent image piece is different, the density may be different. In such a case, the non-uniformity of density cannot be suppressed by using correction values corresponding to the nozzles only. Accordingly, in this embodiment, a gray scale value represented by a pixel is corrected based on a correction value set for each row area.

Method of Calculating Correction Value: First Embodiment

Figure 5:
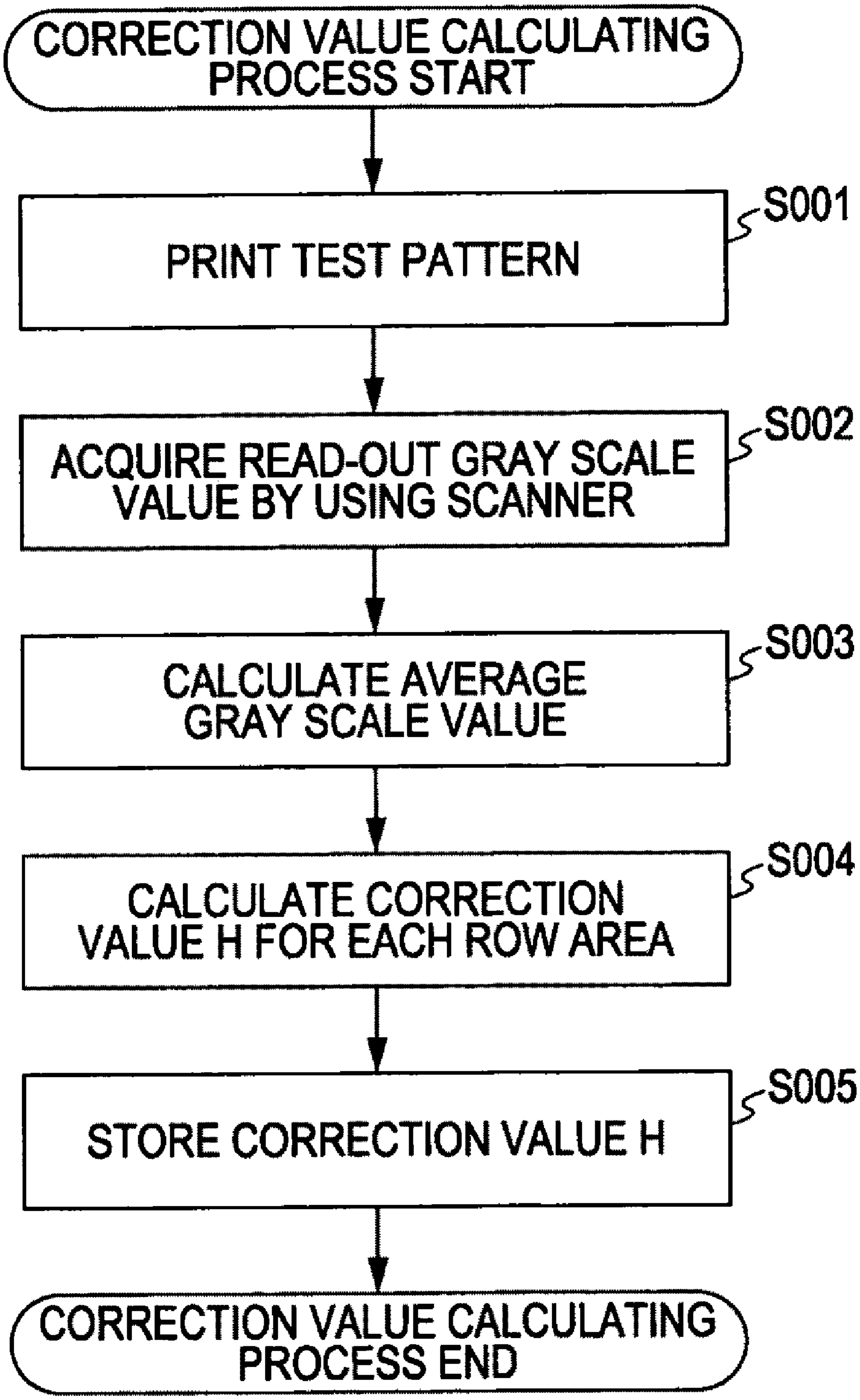
FIG. 5 is a flowchart of a method of calculating a correction value.

FIG. 5 is a flowchart of a method of calculating a correction value that is performed in a test process after manufacture of a printer. For the test, the printer 1 to be tested for non-uniformity of density and a scanner are connected to a computer 50. According to this embodiment, in order to calculate the correction value H for each row area, first, a test pattern is actually printed by the printer 1 (S001). Then, the test pattern is read out by the scanner (S002), and altogether an average gray scale value (to be described later in detail) is calculated for reducing the read-out error of the scanner that occurs between read-out results for the test patterns that are not read out by the scanner (S003). For a row area in which a printing operation is performed to be thicker than a target density (gray scale value), a correction value H for having the row area to be thinner is calculated. On the contrary, for a row area in which a printing operation is performed to be thinner than the target density (gray scale value), a correction value H for having the row area to be thicker is calculated (S004). In addition, in the computer 50, a printer driver, a scanner driver, and a correction value calculating program are installed in advance. Accordingly, the computer 50 prints a test pattern in accordance with the printer driver, the test pattern is read out by the scanner in accordance with the scanner driver, and the correction value H is calculated in accordance with the correction value calculating program.

Figure 6A:
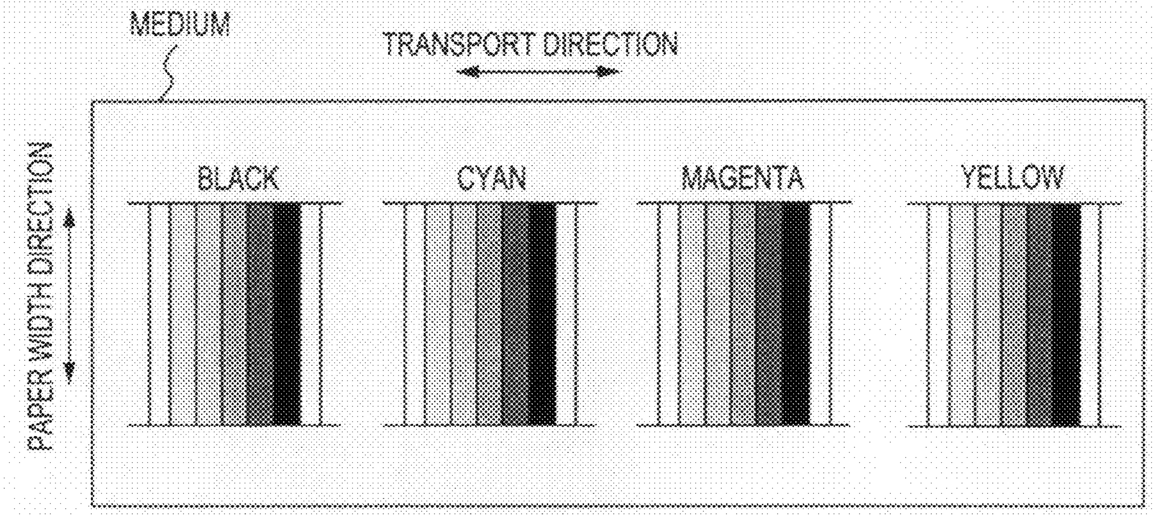
FIG. 6A is a diagram showing a test pattern.
Figure 6B:
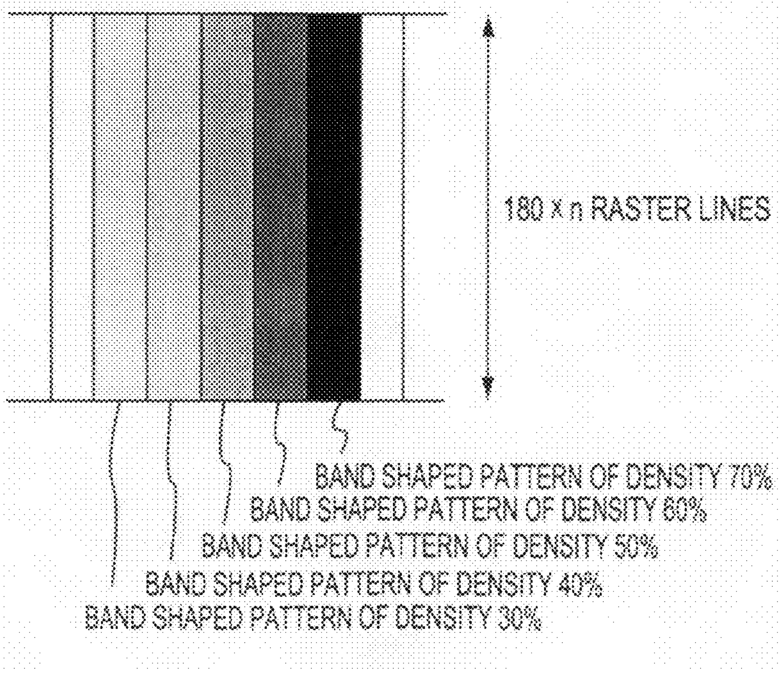
FIG. 6B is a diagram showing a correction pattern.

FIG. 6A is a diagram showing a test pattern to be printed by the printer 1, and FIG. 6B is a diagram showing a correction pattern. The test pattern is configured by four correction patterns that are formed for each nozzle row of different colors (cyan, magenta, yellow, and black). Each correction pattern is configured by band-shaped patterns of five types of density. The band-shaped patterns are generated based on image data of predetermined gray scale values. The gray scale value of the band-shaped pattern is referred to as a directed gray scale value. In addition, a directed gray scale value of a band-shaped pattern of density 30% is denoted by Sa(76), a directed gray scale value of a band-shaped pattern of density 40% is denoted by Sb(102), a directed gray scale value of a band-shaped pattern of density 50% is denoted by Sc(128), a directed gray scale value of a band-shaped pattern of density 60% is denoted by Sd(153), and a directed gray scale value of a band-shaped pattern of density 70% is denoted by Se(178).

In the line head printer 1 according to this embodiment, an image is printed on a sheet by transporting the sheet under the head unit 30 without moving the head unit 30. In addition, in a printer like the printer 1 according to this embodiment that does not have a plurality of the head units 30 (FIG. 3), one nozzle corresponds to one row area (one pixel row). In such a case, a maximum image that can be printed by the printer 1 is configured by raster lines (dot rows aligned in the transport direction) corresponding to the number of nozzles (180×n) that are included in the printer 1. In other words, raster lines are formed by each nozzle for 180×n row areas on the sheet. Accordingly, the number of the correction values H to be calculated is 180×n, and the correction pattern is configured by 180×n raster lines. In addition, a right nozzle in the sheet width direction, that is, a row area corresponding to nozzle #1 of the first head 31(1) is set as the first row area.

Figure 7:
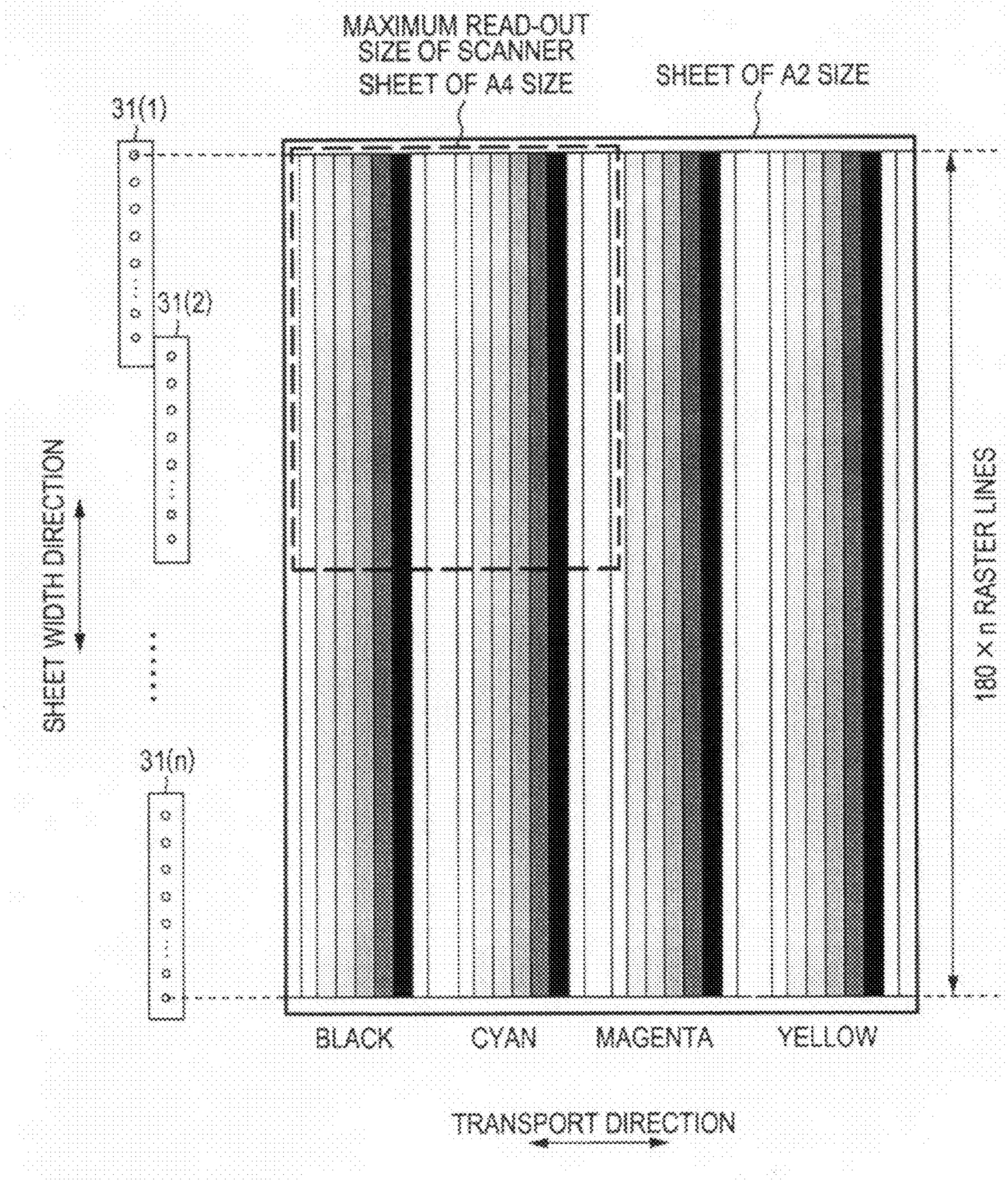
FIG. 7 is a diagram showing a test pattern of the printer.

FIG. 7 is a diagram showing a test pattern of the printer 1 that can print a sheet of A2 size. In a printer that can print a large sheet of A2 size, a plurality of the heads 31 (nozzles) is aligned in the sheet width direction by that much, and accordingly, the length of the correction pattern to be printed in the sheet width direction is increased. However, there is limit for the read-out range of the scanner. For example, for a case where the maximum read-out size of the scanner is A4 size (a dotted part in the figure), when the test pattern printed in a sheet of A2 size is set for the scanner, only a part of the correction pattern can be read out.

Thus, according to the first embodiment, for a case where a correction value H of the printer 1 that prints a sheet of a size (for example, a sheet of A2 size) larger than the readable range of the scanner, the correction pattern is divided into several parts and printed on sheets (for example, sheets of A4 size) that can be read out by the scanner. Accordingly, the entire correction pattern can be read out by the scanner.

Figure 8:
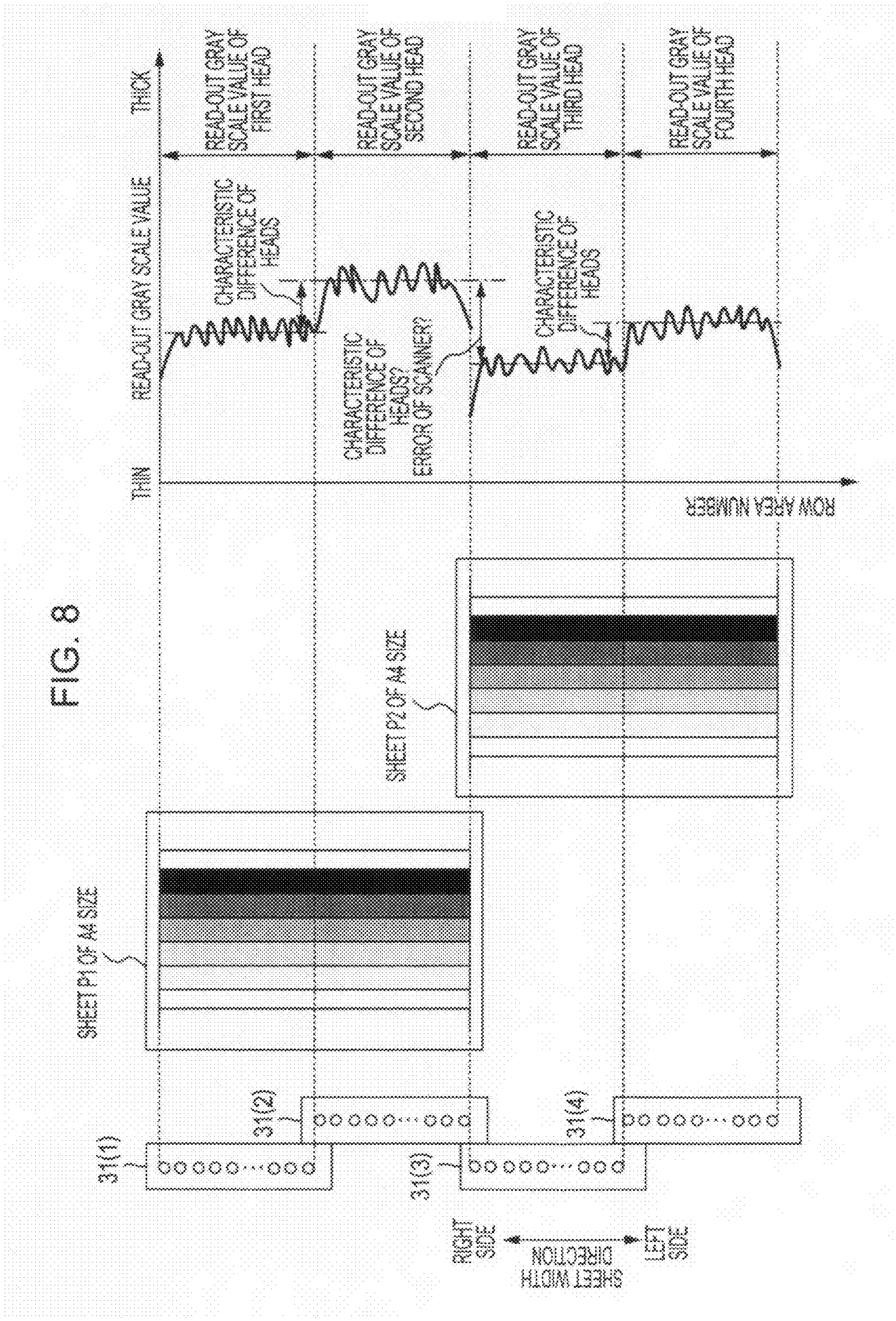
FIG. 8 is a diagram showing a method of printing a test pattern and a read-out result according to a comparative example.

FIG. 8 is a diagram showing a method of printing a test pattern and a result of reading out a correction pattern by using the scanner according to a comparative example that is different from this embodiment. For the convenience of description, the number of the heads is decreased, and only a correction pattern of a nozzle row of one color is exemplified. In the comparative example, a correction pattern is printed on one sheet P1 of A4 size by a first head 31(1) and a second head 31(2). Then, a correction pattern is printed on another sheet P2 of A4 size by a third head 31(3), and a fourth head 31(4). Then, the first sheet P1 is set in the scanner, the correction pattern printed on the sheet P1 is read out by the scanner, then, the sheet P1 is separated from the scanner, the second sheet P2 is set in the scanner, and the correction pattern printed on the sheet P2 is read out by the scanner. As a result, all the correction patterns that are formed by the printer 1 can be read out.

After the correction pattern is read out by the scanner, the image data of the read-out correction pattern is adjusted such that the number of pixel rows in which pixels are aligned in a direction corresponding to the sheet width direction and the number of raster lines (the number of row areas) that configures the correction pattern are the same. In other words, the pixel rows read out by the scanner and the row areas are associated with each other as one-to-one matching. Then, an average value of the read-out gray scale values denoted by the pixels of a pixel row corresponding to a row area is set as the read-out gray scale value of the row area. The read-out result shown in FIG. 8 is a result of reading a stripe-shaped pattern that is formed based on a directed gray scale value. In the figure, the horizontal direction represents the row area number, and the vertical direction represents a read-out gray scale value of the row area. Towards the upper side in the vertical direction, the read-out gray scale value is increased, and the density of a row area is increased in printing. On the other hand, toward the lower side, the read-out gray scale value is decreased, and the density of a row area is decreased in printing. The read-out gray scale values are not constant but scattered regardless of forming the stripe-shaped pattern by using each nozzle based on the predetermined directed gray scale value. This causes the non-uniformity of density.

The correction patterns printed in the first sheet P1 are simultaneously read out by the scanner. However, there is a level difference in a boundary line between a read-out gray scale value (hereinafter, referred to as a read-out gray scale value of the first head) of the correction pattern that is formed by the first head 31(1) and a read-out gray scale value (hereinafter, referred to as a read-out gray scale value of the second head) of the correction pattern that is formed by the second head 31(2). The read-out gray scale value of the first head tends to be lower than the read-out gray scale value of the second head. This is a variation of the read-out gray scale value that is generated due to a characteristic difference of the heads 31. Accordingly, for example, in order to suppress non-uniformity of density of an image formed by the first head 31(1) and the second head 31(2), a correction value for which an image printed by the first head 31(1) is printed thick and an image printed by the second print head 31(2) is printed thin may be calculated.

Similarly, the correction patterns printed on the second sheet P2 are simultaneously read out by the scanner. However, there is a level difference in a boundary line between a read-out gray scale value of a third head and a read-out gray scale value of a fourth head. This is caused by a characteristic difference of the heads 31, and it is known that an image printed by the third head 31(3) is thinner than an image printed by the fourth head 31(4).

In addition, there is also a level difference in the boundary line between the read-out gray scale value of the second head and the read-out gray scale value of third head. However, a correction pattern formed by the second head 31(2) and a correction pattern formed by the third head 31(3) are printed on different sheets P1 and P2 and are not simultaneously read out by the scanner. In addition, the scanner may have an error in the result of read-out due to a use condition and the like. In addition, a read-out error of the scanner may be generated for a case where the sheet P1 is read out by the scanner and a case where the sheet P2 is read out by the scanner.

When taken all together, a difference between the read-out gray scale value of the first head and the read-out gray scale value of the second head and a difference between the read-out gray scale value of the third head and the read-out gray scale value of the fourth head which are simultaneously read by the scanner can be determined as differences due to characteristic differences of heads. However, whether a difference between the read-out gray scale value of the second head (or the read-out gray scale value of the first head) and the read-out gray scale value of the third head (or the read-out gray scale value of the fourth head) that are not simultaneously read out by the scanner is due to a characteristic difference of heads or due to a read-out error of the scanner cannot be determined.

In other words, in the comparative example, a head 31 (or a nozzle) that is used for printing a correction pattern on one sheet PI is not used for printing a correction pattern on the other sheet P2. Thus, it cannot be determined whether a read-out error of the scanner is generated between the read-out result of one sheet P1 and the read-out result of the other sheet P2. Accordingly, when test patterns are printed, same as in the comparative example, a read-out error (a read-out error due to noise or the like) of the scanner between read-out results of correction patterns that are not simultaneously read out by the scanner cannot be corrected.

When a correction value is calculated based on the read-out result (the read-out gray scale value) in which a read-out error of the scanner is not relieved, non-uniformity of density cannot be suppressed. For example, in the read-out result shown in FIG. 8, a result in which a correction pattern of the second head 31(2) is printed thicker than that of the third head 31(3) is acquired. Thus, a correction value is calculated such that an image printed by the second head 31(2) is thin, and an image printed by the third head 31(3) is thick. Accordingly, when the difference between the read-out gray scale value of the second head and the read-out gray scale value of the third head is due to not the characteristic difference of heads but a read-out error of the scanner, the image printed by the second head 31(2) becomes too thin, and the image printed by the third head 31(3) becomes too thick. Therefore, the non-uniformity of density deteriorates.

The object of this embodiment is to calculate a correction value of a printer that prints a sheet of a size larger than the read-out range of a scanner, that is, a printer having a long head more accurately. Next, a method of printing a test pattern according to this embodiment will be described.

Print Example 1 of Test Pattern

Figure 9:
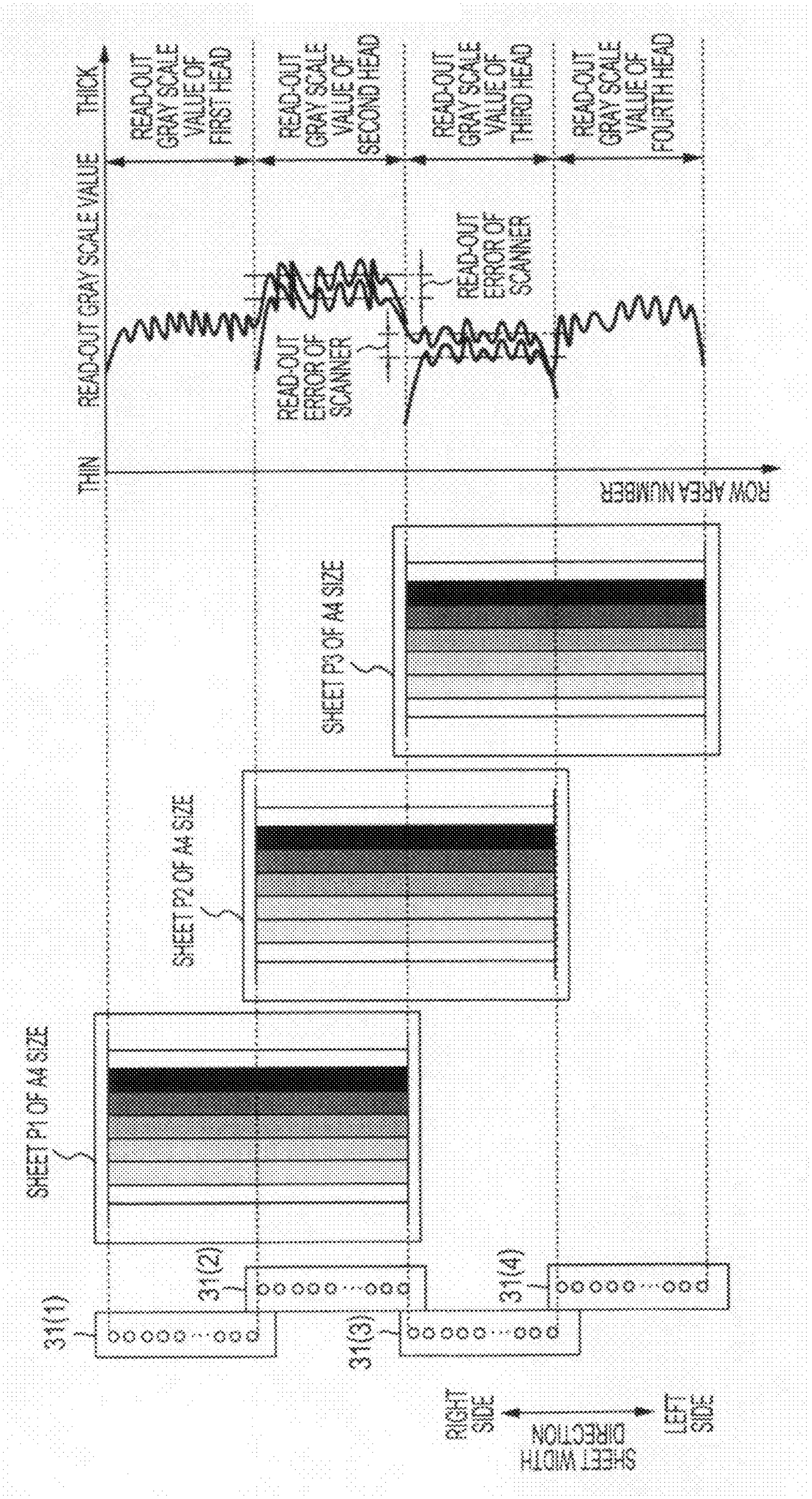
FIG. 9 is a diagram showing a print example 1 of a test pattern and a read-out result.
Figure 10:
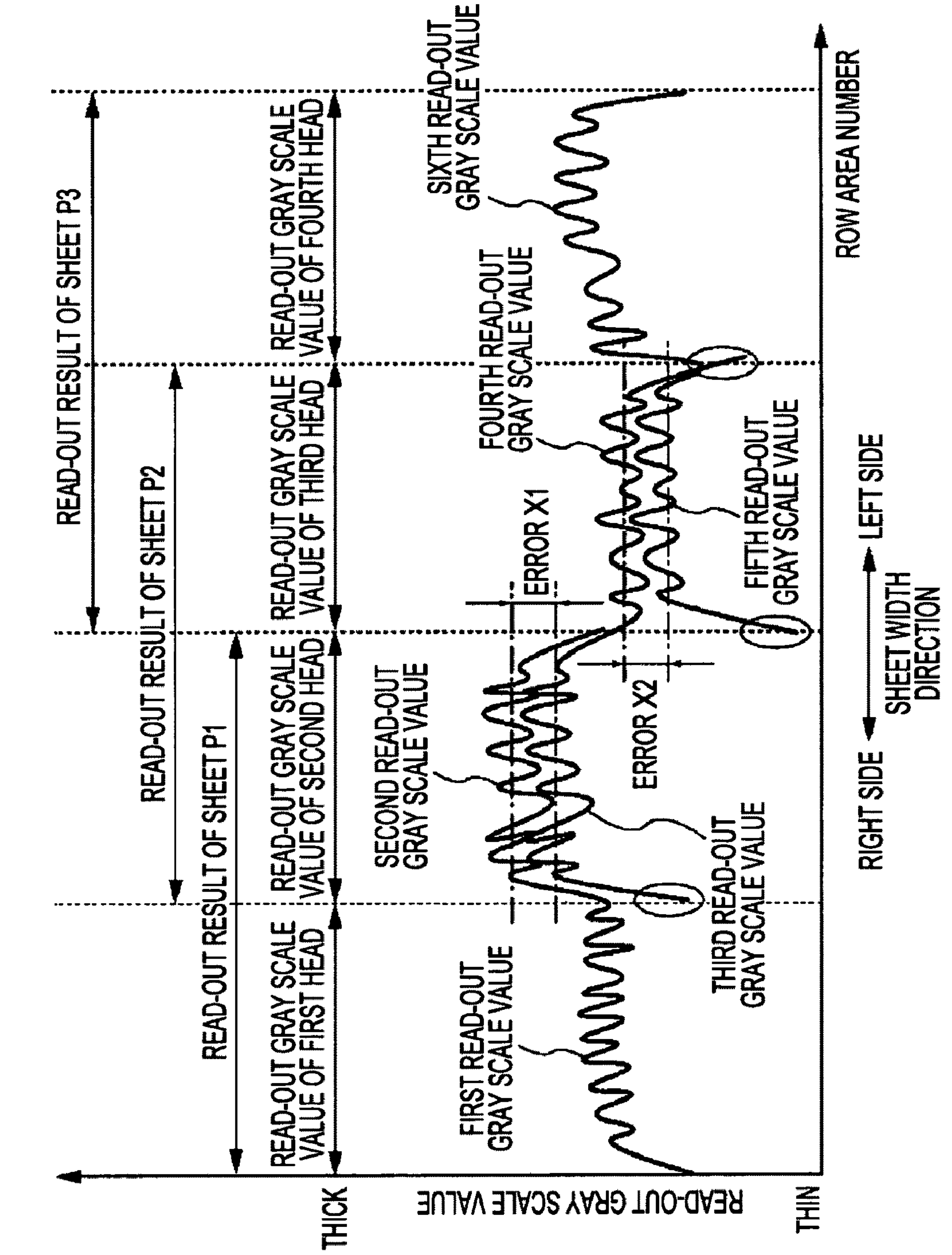
FIG. 10 is an enlarged diagram of the read-out result.

FIG. 9 is a diagram showing a print example 1 of a test pattern according to this embodiment and a read-out result of a stripe-shaped pattern of a directed gray scale value. FIG. 10 is an enlarged diagram of the read-out result. In the print example 1, a correction pattern (corresponding to a first test pattern) is printed on a sheet P1 of A4 size by the first head 31(1) (corresponding to a first nozzle group) and the second head 31(2) (corresponding to a second nozzle group), a correction pattern (corresponding to a second test pattern) is printed on a sheet P2 of A4 size by the second head 31(2) (corresponding to the second nozzle group) and the third head 31(3) (corresponding to a third nozzle group), and a correction pattern is printed on a sheet P3 of A4 size by the third head 31(3) and the fourth head 31(4). In other words, in the print example 1, correction patterns are printed on two different sheets P1 and P2 by the second head 31(2), and correction patterns are printed on two different sheets P2 and P3 by the third head 31(3). Thereafter, three sheets P1 to P3 are individually read out by the scanner. Then, a pixel raw of image data acquired by reading out the correction pattern by using the scanner and a row area are associated with each other by one to one matching. In the figure, the result of read-out gray scale values of each row area are shown as graphs.

Here, for description, as shown in FIG. 10, a read-out result of the correction pattern printed on the sheet P1 by the first head 31(1) is referred to as a "first read-out gray scale value", and a read-out result of the correction pattern printed on the sheet P2 by the second head 31(2) is referred to as a "second read-out gray scale value". In addition, a read-out result of the correction pattern printed on the sheet P2 by the second head 31(2) is referred to as a "third read-out gray scale value", a read-out result of the correction pattern printed on the sheet P2 by the third head 31(3) is referred to as a "fourth read-out gray scale value", a read-out result of the correction pattern printed on the sheet P3 by the third head 31(3) is referred to as a "fifth read-out gray scale value", and a read-out result of the correction pattern printed on the sheet P3 by the fourth head 31(4) is referred to as a "sixth read-out gray scale value".

As shown in the read-out results of FIG. 10, although the read-out results are results of the correction patterns printed by the same second head 31(2), the second read-out gray scale value is larger (thicker) than the third read-out gray scale value. A difference X1 between the second read-out gray scale value and the third read-out gray scale value is a read-out error X1 of the scanner for a case where the sheet P1 is read out by the scanner and a case where the sheet P2 is read out by the scanner. In other words, even for a same image, when the sheet P1 is read out by the scanner, the image may be easily read out as a large gray scale value. On the other hand, when the sheet P2 is read out by the scanner, the image may be easily read out as a small gray scale value.

Similarly, although the read-out results are results of the correction patterns printed by the same third head 31(3), the fourth read-out gray scale value is larger (thicker) than the fifth read-out gray scale value. A difference X2 between the fourth read-out gray scale value and the fifth read-out gray scale value is a read-out error X2 of the scanner for a case where the sheet P2 is read out by the scanner and a case where the sheet P3 is read out by the scanner. In other words, when the sheet P3 is read out by the scanner, an image may be easily read out as a small gray scale value.

when a correction value is calculated without correcting the read-out errors X1 and X2 of the scanner, the non-uniformity of density is not resolved. For example, it is assumed that a correction value H'(1) of a row area corresponding to the first head 31(1) is calculated based on the first read-out gray scale value, a correction value H'(2) of a row area corresponding to the second head 31(2) is calculated based on the second read-out gray scale value, and a correction value H'(3) of a row area corresponding to the third head 31(2) is calculated based on the fifth read-out gray scale value.

The first read-out gray scale value is smaller (thinner) than the second read-out gray scale value, and the first read-out gray scale value and the second read-out gray scale value are read-output results of the sheet P1 that are simultaneously read out by the scanner. Accordingly, a difference between the first read-out gray scale value and the second read-out gray scale value is a difference due to characteristic differences of heads. Thus, by using the correction value H'(1) on the basis of the first read-out gray scale value and the correction value H'(2) on the basis of the second read-out gray scale value, the non-uniformity of density of an image printed by the first head 31(1) and the second head 31(2) can be relieved.

However, a difference between the second read-out gray scale value and the fifth read-out gray scale value, a read-out error of the scanner is included, in addition to the characteristic difference of heads. In particular, in the difference between the second read-out gray scale value and the firth read-out gray scale value, both a read-out error X1 of the scanner for the sheets P1 and P2 and a read-out error X2 of the scanner for the sheets P2 and P3 are included. The second read-out gray scale value is a read-out result of a case where a large gray scale value can be easily read out by the scanner. On the other hand, the fifth read-out gray scale value is a read-out result of a case where a small gray scale value can be easily read by the scanner. Accordingly, by using the correction value H'(2) on the basis of the second read-out gray scale value, an image printed by the second head 31(2) is corrected to be thinner. In addition, by using the correction value H'(3) on the basis of the fifth read-out gray scale value, an image printed by the third head 31(3) is corrected to be thicker. As a result, an image corrected to be thinner and an image corrected to be thicker are disposed adjacent to each other, and thereby there is a problem that the non-uniformity of density deteriorates.

Thus, according to this embodiment, the read-out error of the scanner is decreased by averaging the read-out results of correction patterns that are printed on different sheets P1 to P3 by the same heads 31(2) and 31(3) and are not read out by the scanner.

Figure 11:
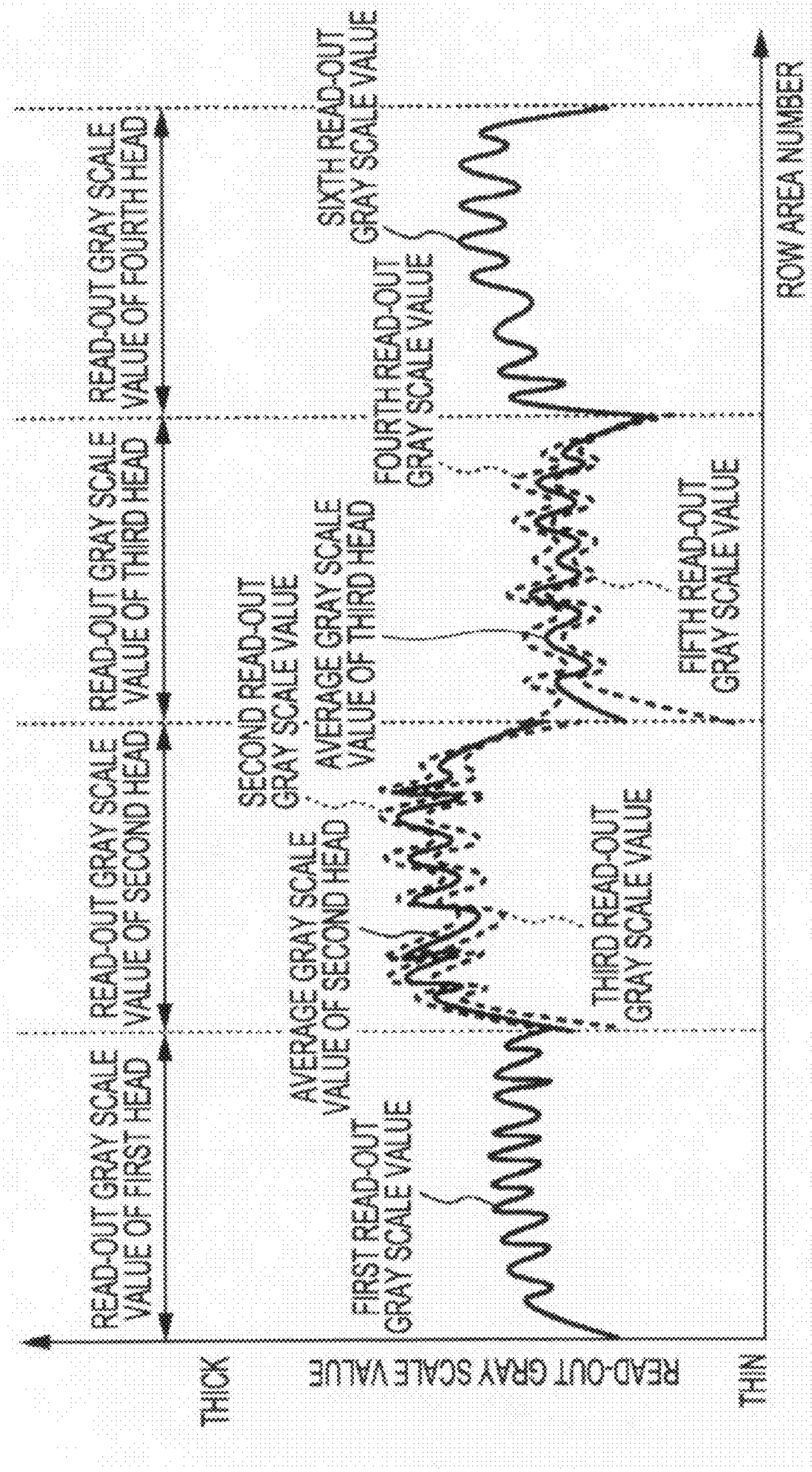
FIG. 11 is a diagram showing average gray scale values for decreasing the read-out error of the scanner.

FIG. 11 is a diagram showing average gray scale values for decreasing the read-out error of the scanner. Here, an average value of the second read-out gray scale value (dotted line) and the third read-out gray scale value (dotted line) that are two read-out results of the correction patterns printed by the second head 31(2) is referred to as an "average gray scale value (solid line) of the second head". Thereafter, a correction value of the second head 31(2), that is, a correction value (corresponding to a correction value of the second nozzle group) of the row area that can be assigned to the second head 31(2) is calculated based on the average gray scale value of the second head.

In addition, an average value of the fourth read-out gray scale value (dotted line) and the fifth read-out gray scale value (dotted line) that are two read-out results of correction patterns printed by the third head 31(3) is referred to as an "average gray scale value (solid line) of the third head". In addition, the first head 31(1) or the fourth head 31(4) prints a correction pattern on one sheet only. Thus, the first head 31(1) or the fourth head 31(4) has only one read-out gray scale value for one row area, and accordingly, averaging the read-out gray scale value is not needed. Therefore, finally, correction values H corresponding to each row area are calculated based on the first read-out gray scale value, the average gray scale value of the second head, the average gray scale value of the third head, and the sixth read-out gray scale value.

In other words, as a correction value H of the row area that can be assigned to the second head 31(2), a correction value H to which a characteristic (a characteristic in which a large gray scale value can be easily read out) at a time when the sheet P1 is read out by the scanner and a characteristic (a characteristic in which a small gray scale value can be easily read out) at a time when the sheet P2 is read out by the scanner are added is calculated. In addition, as a correction value H of the row area that can be assigned to the third head 31(3), a correction value H to which a characteristic (a characteristic in which a small gray scale value can be easily read out) at a time when the sheet P2 is read out by the scanner and a characteristic (a characteristic in which a smaller gray scale value can be easily read out) at a time when the sheet P3 is read out by the scanner are added is calculated.

In other words, in the print example 1, as shown in FIG. 9, sheets P1 to P3 are fed with being deviated by a length of one head 31 in the sheet width direction. Accordingly, a correction value H is calculated based on the read-out result of each one correction pattern printed on a same sheet by each of the heads 31 adjacent in the sheet width direction. As a result, correction values H of the row areas that are assigned to the heads 31 adjacent to each other are calculated based on the read-out results in which the read-out characteristic of a same scanner is included, and thereby the non-uniformity of density is suppressed. In particular, a print image of the first head 31(1) that is corrected by using the correction value H on the basis of the read-out result of the sheet P1, a print image of the second head 31(2) that is corrected by using the correction value H on the basis of an average value of the read-out result of the sheet P1 and the read-out result of the sheet P2, a print image of the third head 31(3) that is corrected by using the correction value H on the basis of an average value of the read-out result of the sheet P2 and the read-out result of the sheet P3, and a print image of the fourth head 31(4) that is corrected by using the correction value H on the basis of the read-out result of the sheet P3 are sequentially aligned in the sheet width direction. Accordingly, each read-out characteristic from a time when the scanner reads out the sheet P1 to a time when the scanner reads out the sheet P3 is alleviated. Therefore, as described above, deterioration of the non-uniformity of density, which occurs by aligning a print image (a print image of the second head 31(2)) that is corrected by using the correction value (H'(2)) on the basis of the read-out result (the second read-out gray scale value) of one sheet (the sheet P1) and a print image (a print image of the third head 31(3)) that is corrected by using the correction value (H'(3)) on the basis of the read-out result (the fifth read-out gray scale value) of the other sheet (sheet P3), can be prevented.

In addition, as the second head 31(2) and the third head 31(2), by printing correction patterns on a plurality of sheets and calculating a correction value H based on an average value of a plurality of read-out results, a read-out error at a time when each sheet is read out by the scanner is alleviated, and whereby the read-out result is close to an actual value. As a result, the accuracy of the correction value H is increased, and whereby the non-uniformity of density can be suppressed further.

As described above, by repeatedly printing correction patterns by using a same head (or a same nozzle) on sheets P1 to P3 (sheets that are not simultaneously read out by the scanner) that are fed with being deviated with one another in the sheet width direction and calculating a correction value H by averaging the read-out results of the correction patterns printed by a same head, a correction value H in which the read-out error of the scanner is relieved can be calculated. As a result, the non-uniformity of density can be relieved.

While each of the read-out gray scale value of the first head and the read-out gray scale value of the fourth head has one read-out gray scale value for one row area, each of the read-out gray scale value of the second head and the read-out gray scale value of the third head has two read-out gray scale values for one row area. Accordingly, a correction value H corresponding to the second head 31(2) or the third head 31(3) can be calculated more accurately than the correction value H corresponding to the first head 31(1) or the fourth head 31(4). The printer according to this embodiment, as shown in FIG. 21 described below, feeds a sheet with a center portion of the transport belt 22 in the sheet width direction used as a reference. Thus, a head that is located on the center in the sheet width direction, as the second head 31(2) or the third head 31(3), is more frequently used than the first head 31(1) located on the right end or the fourth head 31(4) located on the left end. Accordingly, the second head 31(2) and the third head 31(3) that are located on the center print the correction patterns on different sheets repeatedly, and whereby the correction value H having a high frequency of use can be calculated accurately. In addition, an image located on the center of a sheet can be more easily recognized than images located on the ends. Thus, by calculating the correction value H of an image located in the center portion of a sheet, which can be easily recognized, more accurately, an image having excellent image quality can be acquired.

Figure 12:
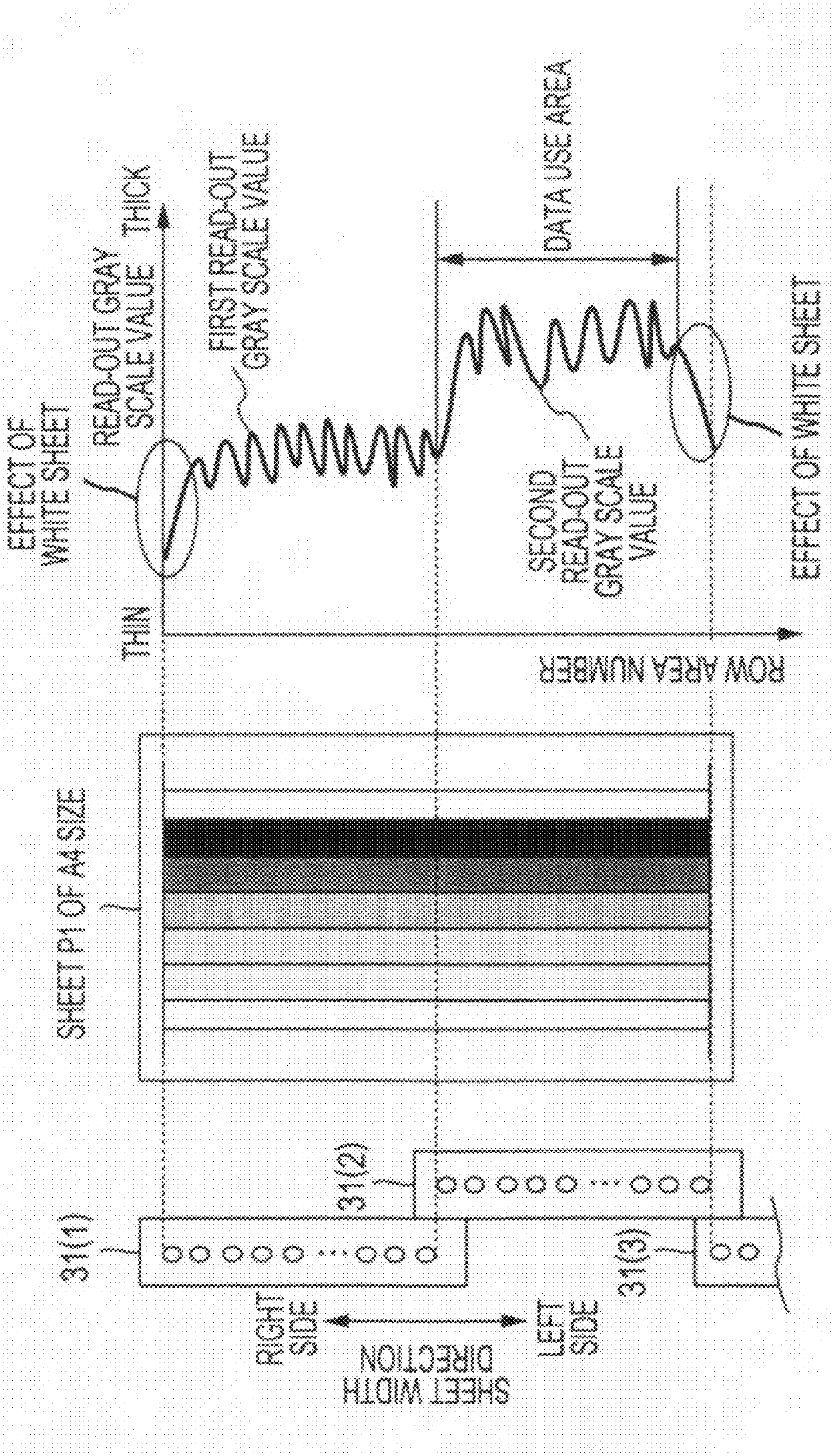
FIG. 12 is a diagram showing a range used for calculating an average gray scale value.

FIG. 12 is a diagram showing a range of the second read-out gray scale value that is used for calculating an average gray scale value of the second head. When a sheet on which the correction pattern is printed, for example, is "white color", the read-out result of a correction pattern printed by a nozzle located in the left end portion of the second head 31(2) in the sheet width direction among the second read-out gray scale values may be determined to be thinner than the actual density of the correction pattern under the influence of a white background of a sheet (a background color of a sheet). Thus, when the average gray scale value of the second head is to be calculated, a read-out gray scale value of a correction pattern formed by a nozzle, which is located in the left end portion of the second head 31(2), among the second read-out gray scale values is not used (a read-out result formed by a nozzle that is located in one side end portion of the second nozzle group is excluded).

In addition, as shown in FIG. 10 (areas surrounded by ovals), a read-out result of a correction pattern formed by a nozzle that is located in the right end portion of the second head 31(2) among the third read-out gray scale values may be influenced by a white background of the sheet, and accordingly, it is preferable that the read-out result is not used for calculating the average gray scale value of the second head. Similarly, when the average gray scale value of the third head is to be calculated, it is preferable that a read-out gray scale value of a correction pattern formed by a nozzle, which is located in the left end portion of the third head 31(3), among the fourth read-out gray scale values and a read-out gray scale value of a correction pattern formed by a nozzle, which is located in the right end portion of the third head 31(3), among the fifth read-out gray scale values are not used. In addition, as shown in FIG. 11, when an average gray scale value is to be calculated, the average value may be calculated by including read-out results of correction patterns printed near margins of a sheet. However, as described above, a more accurate correction value H can be acquired by calculating the average value with the read-out results, which may be influenced by the white background of the sheet, excluded.

As described above, the read-out gray scale value of the second head and the read-out gray scale value of the third head have two read-out results, respectively. Thus, a read-out result that is influenced by the white background of the sheet may be excluded. However, a nozzle located to the right side of the first head 31(1) does not exist. Accordingly, a correction pattern formed by a nozzle that is located in the right end portion of the first head 31(1) is adjacent to the white background portion of the sheet, and accordingly, the correction pattern may be influenced by the white background portion. Similarly, any nozzle does not exist to the left side of the head 31(*n*) (here, the fourth head 31(4)) located on the leftmost side in the sheet width direction.

Thus, for example, preliminary nozzles that are not used for an actual printing operation may be disposed on the right end portion of the first head 31(1) and the left end portion of the fourth head 31(4). In such a case, when a read-out result of a correction pattern of the first head 31(1) or the fourth head 31(4) is needed, a correction pattern is printed by the preliminary nozzle, as well. As a result, it can be prevented that a read-out gray scale value of the correction pattern formed by the nozzle located in the right end portion of the first head 31(1) and a read-out gray scale value of the correction pattern formed by the nozzle located in the left end portion of the fourth head 31(4) are influenced by the white background of the sheet. Therefore, a more accurate correction value H can be calculated. Alternatively, instead of preparing the preliminary nozzles, the degree of influence of the white background portion on a row area located near the white background portion of the sheet may be calculated, and the read-out gray scale values of correction patterns formed by the nozzle located in the right end portion of the first head 31(1) and the nozzle located in the left end portion of the fourth head 31(4) may be corrected.

In addition, in the comparative example (FIG. 8), the sheets P1 and P2 are fed with being deviated from each other by a length of two heads 31 in the sheet width direction, and the correction patterns are printed thereon. On the other hand, in the print example 1 (FIG. 9), the sheets P1 to P3 are fed with being deviated from each other by a length of one head 31 in the sheet width direction. Accordingly, in the print example 1, three boundary lines of four heads 31(1) to 31(4) are printed in the center portion of a same sheet all the time. In particular, a boundary line between the first head 31(1) and the second head 31(2) is printed in the center portion of the sheet P1, a boundary line between the second head 31(2) and the third head 31(3) is printed in the center portion of the sheet P2, and a boundary line between the third head 31(3) and the fourth head 31(4) is printed in the center portion of the sheet P3.

In the read-out result of a correction pattern that is printed in the boundary line portion of the heads 31, a level difference due to a characteristic difference of heads is generated. For example, as shown in FIG. 10, the second read-out gray scale value is larger than the first read-out gray scale value. Thus, an image printed by the first head 31(1) is visually recognized relatively thin, and an image printed by the second head 31(2) is visually recognized relatively thick. When these images are adjacently located without any density correction, the boundary line portion becomes a stripe. Accordingly, the boundary line portion is visually recognized easily and causes deterioration of an image. Therefore, a correction value H of a row area corresponding to the boundary line portion of the heads 31 is needed to be calculated more accurately.

In the comparative example (FIG. 8), a boundary line between the second head 31(2) and the third head 31(3) is printed on another sheet. Thus, a correction value corresponding to the second head 31(2) is calculated based on the read-out result of the sheet P1, and a correction value corresponding to the third head 31(3) is calculated based on the read-out result of the sheet P2. In the read-out results of the sheet P1 and the sheet P2, a read-out error of the scanner is included, and accordingly, the non-uniformity of density cannot be suppressed.

Moreover, a correction pattern printed in the boundary line between the second head 31(2) and the third head 31(3) is adjacent to the margin of the sheet. Thus, the read-out result of the correction pattern printed in the boundary line between the second head 31(2) and the third head 31(3) may be influenced by the white background of the sheet so as to result in a read-out gray scale value representing thinner density than the actual density. In such a case, the correction value H of the row area corresponding to the boundary line between the second head 31(2) and the third head 31(3) is not calculated accurately, and, for example, a boundary line between an image printed by the second head 31(2) and an image printed by the third head 31(3) is printed thick, whereby the image quality deteriorates.

In other words, as in the comparative example, when the correction pattern printed in the boundary line of the heads 31 is located adjacent to the margin of the sheet, the correction value H of the row area corresponding to the boundary line of the head 31 cannot be calculated. Thus, as in the print example 1, the correction pattern is printed in the center portion (other than the end portion of the sheet) of the sheet for the boundary line of the head 31, the read-out result of the correction pattern printed in the boundary line of the head 31 becomes stable, and whereby an accurate correction value H can be calculated. As a result, the boundary line of the image printed by another head 31 cannot be easily recognized visually, and therefore, a high-quality image can be acquired.

Print Example 2 of Test Pattern

Figure 13:
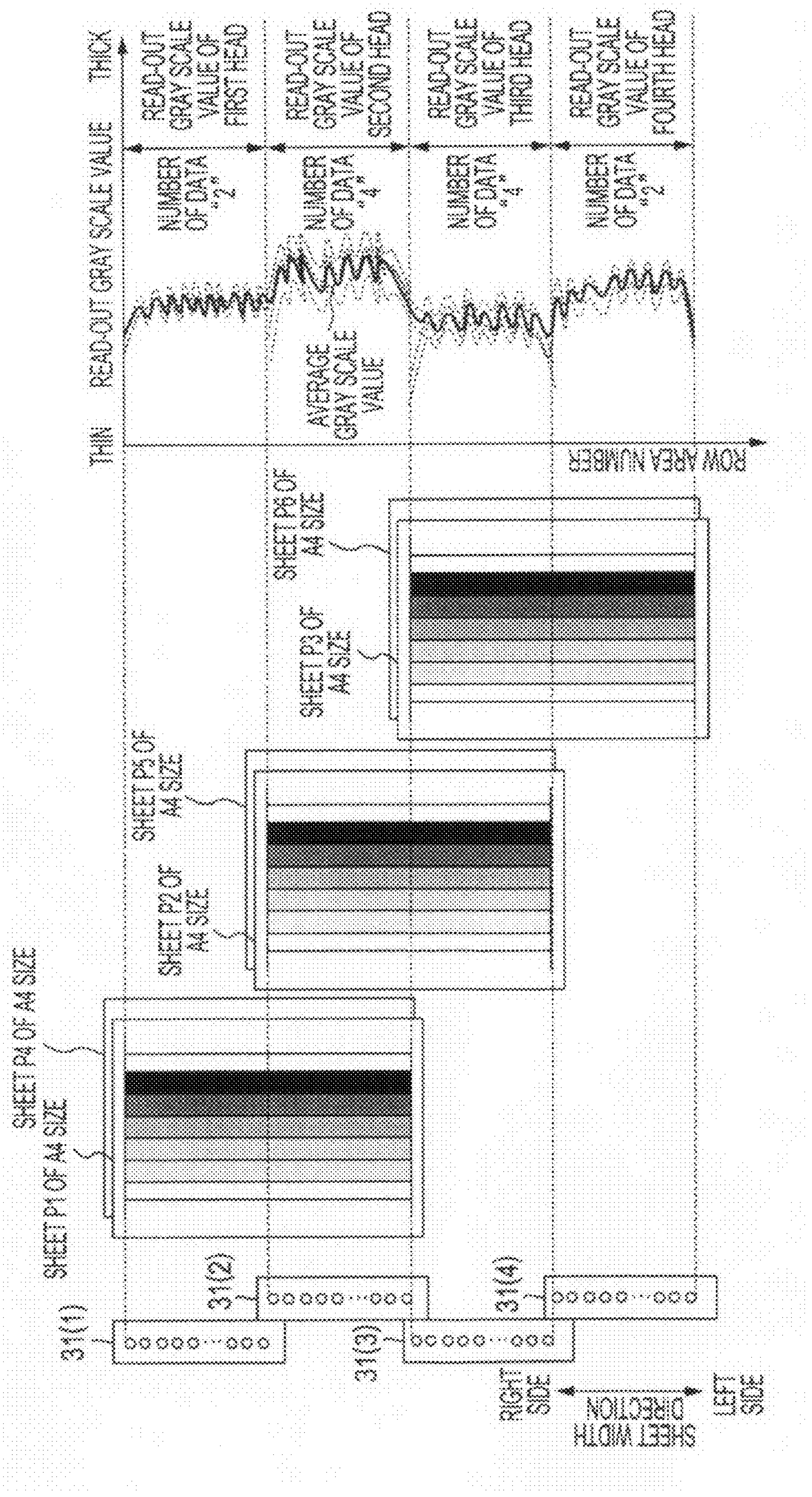
FIG. 13 is a diagram showing a print example 2 of a test pattern and a read-out result.

FIG. 13 is a diagram showing a print example 2 of a test pattern and a read-out result of a stripe-shaped pattern of a directed gray scale value. In the print example 2, correction patterns are printed on sheets P1 to P6 corresponding to twice the number of sheets according to the print example 1. The correction patterns are printed on two sheets P1 and P4 of size A4 by the first head 31(1) and the second head 31(2) (a plurality of first test patterns is printed), the correction patterns are printed on two sheets P2 and P5 of size A4 by the second head 31(2) and the third head 31(3) (a plurality of second test patterns is printed), and the correction patterns are printed on two sheets P3 and P6 of size A4 by the third head 31(3) and the fourth head 31(4). These six sheets P1 to P6 are individually read by a scanner. As a result, as the read-out gray scale values of the first head and the read-out gray scale values of the fourth head, two read-out results are respectively acquired, and as the read-out gray scale values of the second head and the read-out gray scale values of the third head, four read-out results are respectively acquired.

Then, among the read-out results of the sheets P1 and P4, an average value (corresponding to an average value of a plurality of first read-out gray scale values) of the read-out results of the correction patterns printed by the first head 31(1) is calculated as an "average gray scale value of the first head". In addition, among the read-out results of the sheets P1, P4, P2, and P5, an average value (corresponding to an average value of a plurality of second read-out gray scale values and a plurality of third read-out gray scale values) of read-out results of the correction patterns printed by the second head 31(2) is calculated as an "average gray scale value of the second head". In addition, among the read-out results of the sheets P2, P5, P3, and P6, an average value of the read-out results of correction patterns printed by the third head 31(3) is calculated as an "average gray scale value of the third head". Among the read-out results of the sheets P3 and P6, an average value of the read-out results of the correction patterns printed by the fourth head 31(4) is calculated as an "average gray scale value of the fourth head". In FIG. 13, the read-out results of sheets P1 to P6 are denoted by dotted lines, and the average gray scale value is denoted by a solid line. In addition, when an average value is to be calculated, it is preferable that the read-out gray scale value that may be influenced by the white background of a sheet is excluded. Accordingly, a correction value H can be calculated more accurately.

In the print example 1 (FIG. 9), the number of data values (the number of read-out results) of the read-out gray scale values of the first head and the read-out gray scale values of the fourth head for each row area is one. However, in the print example 2, the number of data values is increased by two times to be two. Similarly, in the print example 1, the number of data values of the read-out gray scale values of the second head and the read-out gray scale values of the third head for each row area is two. However, in the print example 2, the number of data values is increased by two times to be four. As described above, by increasing the number of times of printing the correction patterns performed by the head 31, the acquired number of data values can be increased.

As the acquired number of data values is increased, the read-out error of the scanner at a time when the sheets P1 to P6 are read out by the scanner can be relieved as that much. For example, it is assumed that a characteristic at a time when the sheet P1 is read out by the scanner is a characteristic in which a large gray scale value can be easily read. In such a case, when only a read-out result of the sheet P1 is acquired, and a correction value H is calculated based on the read-out result of the sheet P1, the degree of correction to be thin becomes high. Accordingly, by acquiring a plurality of read-out results that is not simultaneously read out by the scanner and calculating the correction value H based on an average value of the plurality of read-out results, the read-out error of the scanner can be relieved. Therefore, a correction value H having high accuracy can be acquired. As a result, the non-uniformity of density is resolved further.

In addition, in the print example 2, same as in the print example 1, when sheets are fed with a length corresponding to one head 31 deviated with each other in the sheet width direction, two heads 31 adjacently located in the sheet width direction print correction patterns in a same sheet. Accordingly, the correction values H for the row areas corresponding to the heads 31 adjacently located are calculated so as to include the read-out characteristic of the same scanner. As a result, even when images printed by another head 31 are lined up, the non-uniformity of density is suppressed.

In addition, in the boundary line portions of the heads 31, the correction patterns are printed in the center portions of two sheets. In other words, two read-out results in which the correction patterns printed in each boundary line of heads 31 are stable can be acquired. As a result, the boundary line of an image printed by another head 31 cannot be easily recognized visually, and accordingly, a high-quality image can be acquired.

In addition, the numbers of data values of the second head 31(2) and the third head 31(3) that are located on the center and have a high frequency of use can be configured to be larger than those of the first head 31(1) and the fourth head 31(4) that are located on both ends. Accordingly, a correction value H having a high frequency of use can be calculated more accurately.

Print Example 3 of Test Pattern

Figure 14:
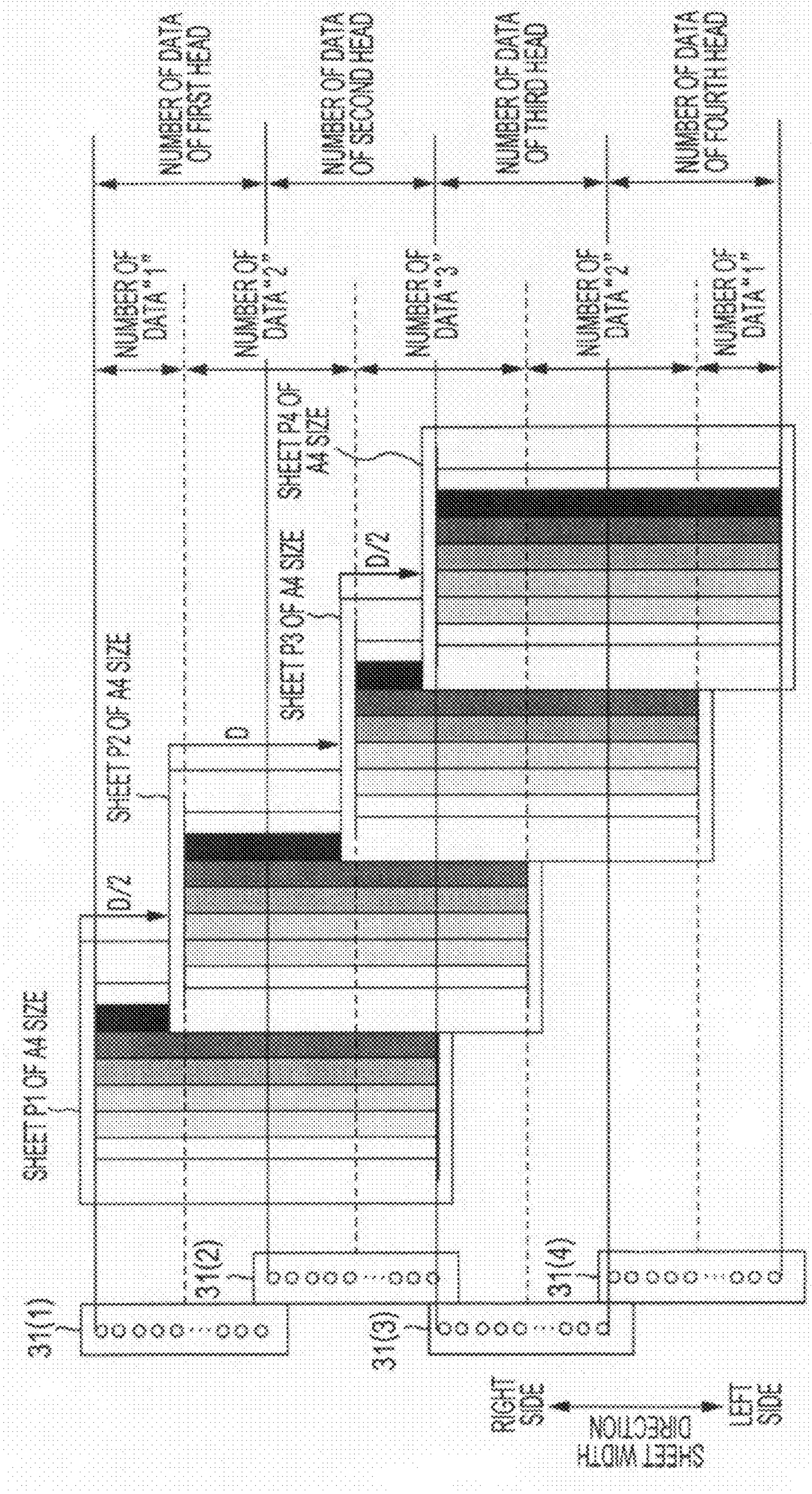
FIG. 14 is a diagram showing a print example 3 of a test pattern.

FIG. 14 is a diagram showing a print example 3 of a test pattern. In the print examples 1 and 2, sheets are fed with being deviated from each other by a length corresponding to one head 31 in the sheet width direction. On the other hand, in the print example 3, sheets P1 to P4 are fed with a gap that is equal to or smaller than a length of one head 31. Here, the length of the head 31 in the sheet width direction is denoted by "D". As shown in FIG. 14, a sheet P2 is fed with being deviated by a half "D/2" of the length of the head 31 with respect to a sheet P1, and a sheet P4 is fed with being deviated by "D/2" with respect to the sheet P3.

In other word, correction patterns are printed on the sheet P1 by the first head 31(1) and the second head 31(2), correction patterns are printed on the sheet P2 by nozzles, which are located in the left half part from the center portion, of the first head 31(1) and nozzles, which are located in the right half part from the center portion, of the second head 31(2) and the third head 31(3), and correction patterns are printed on the sheet P3 by nozzles, which are located in the left half part from the center portion, of the second head 31(2) and nozzles, which are located in the right half part, of the third head 31(3) and the fourth head 31(4), and correction patterns are printed on the paper sheet P4 by the third head 31(3) and the fourth head 31(4) (here, the right half part of the first head 31(1) corresponds to a first nozzle group, a left half part of the first head 31(1) and the second head 31(2) correspond to a second nozzle group, a right half part of the third head 31(3) corresponds to a third nozzle group, and a left half part of the first head 31(1) and the right half part of the second head 31(2) correspond to nozzles on one side, and a left half part of the second head 31(2) corresponds to nozzles on the other side).

As a result, the number of data values in the center portion in the sheet width direction, that is, the boundary line portion of the second head 31(2) and the third head 31(3) becomes a maximum of three. In addition, the number of data values is decreased toward left and right end portions in the sheet width direction. For row areas from which a plurality of read-out gray scale values are acquired, an average gray scale value is calculated by averaging the plurality of read-out gray scale values. From both end portions in the sheet width direction to the center portion, the number of data values can be increased by one each time. As described above, as the number of data values is increased gradually, the accuracy of the read-out result of the correction value H is improved gradually. As a result, even when images corrected by using correction values H that are calculated based on different numbers of data values are adjacently located, the boundary line cannot be easily recognized visually.

In the printer according to this embodiment, the head 31 located on the center in the sheet width direction has a high frequency of use. Accordingly, as in the print example 3, as the number of data values for row areas corresponding to the head (nozzle) located in the center portion in the sheet width direction is increased, a correction value H having a high frequency of use can be calculated accurately, and thereby a high-quality image can be acquired.

In addition, by calculating the correction value H for the row area corresponding to the boundary line of the heads 31 more accurately, the boundary line of an image printed by another head 31 cannot be easily recognized visually. In the print example 3 and the print example 2, two read-out results in which the correction patterns printed in the boundary line of the heads 31 are stable can be acquired. Moreover, while the correction patterns are printed on six sheets P1 to P6 in the print example 2, the correction patterns are printed on four sheets P1 to P4 in the print example 3. In other words, in the print example 3, sheets P1 to P4 are fed with being deviated from each other by a distance in the sheet width direction of the head 31 which is equal to or smaller than "D". Thus, even when the number of printed correction patterns is smaller than that of the print example 2, a same number of the read-out results in which the correction patterns printed in the boundary lines of the heads 31 are stable can be acquired. When the number of printing sheets is decreased, a time for printing the correction patterns is shortened, and the amounts of consumption of the ink and the sheets are decreased. However, the maximum data number of "3" in the print example 3 is smaller than the maximum data number of "4" in the print example 2. In addition, the number of data values for the row areas corresponding to the nozzles located on both ends in the sheet width direction is smaller than that of the print example 2.

Figure 15:
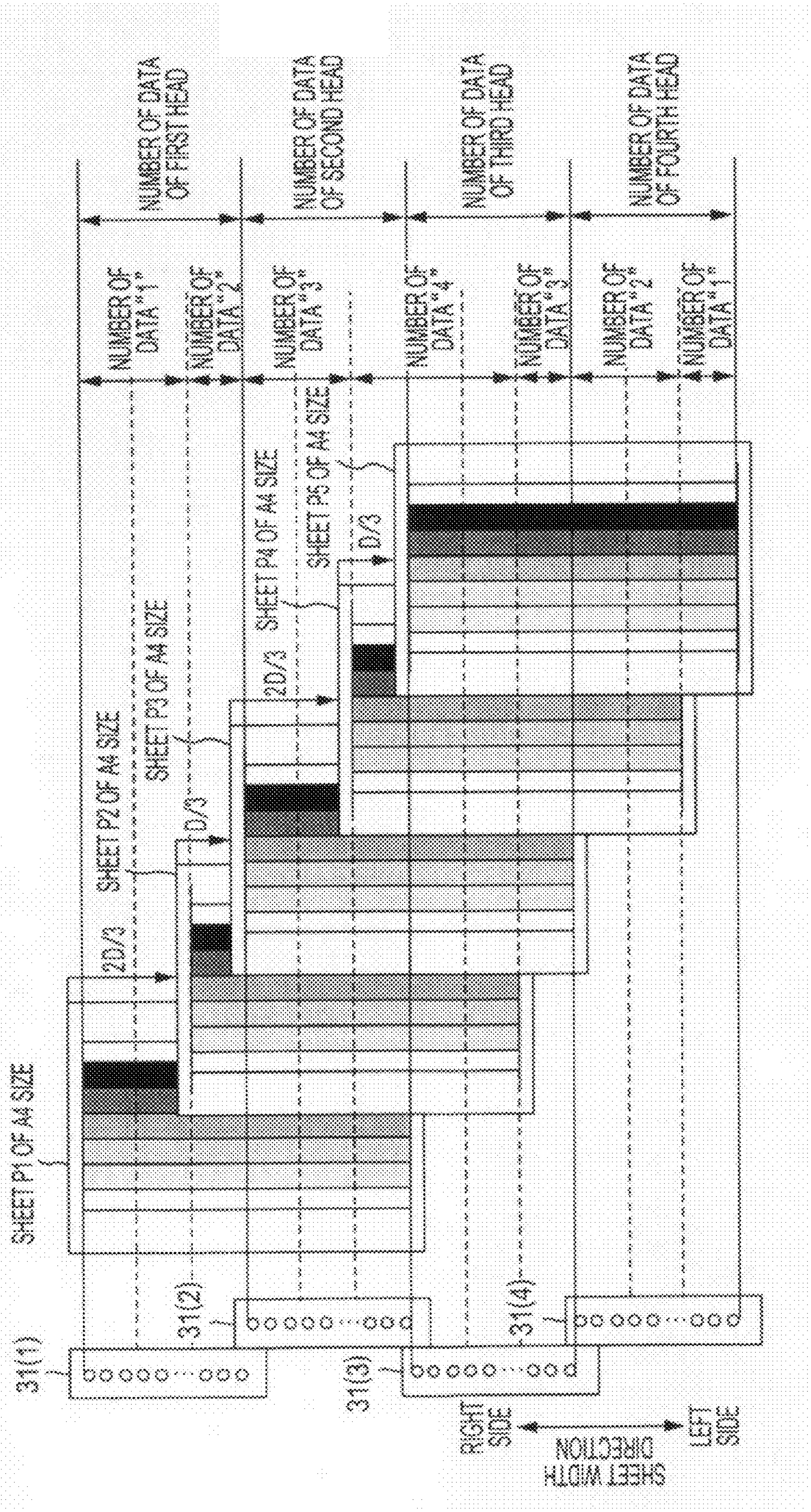
FIG. 15 is a diagram showing a print example of a test pattern that is different from that of FIG. 14.

FIG. 15 is a diagram showing a print example of a test pattern that is different from that of FIG. 14. In FIG. 15, in the row areas corresponding to the heads (nozzles) located in the center portion in the sheet width direction, the correction patterns are printed such that a same number of data values as the maximum data number of "4" in the print example 2 can be acquired. In FIG. 15, sheets are fed with being deviated by a distance of "D/3" that is shorter than that of FIG. 14. As a result, while the correction patterns are printed on six sheets P1 to P6 in the print example 2, the correction patterns are printed on five sheets P1 to P5 in FIG. 15. However, the maximum data is the same as in the print example 2.

The number of data values for the row areas corresponding to the boundary line portion of the first head 31(1) and the second head 31(2) and the number of data values for the row areas corresponding to the boundary line portion of the third head 31(3) and the fourth head 31(4) may be set two, which is the same as in the print example 2. Moreover, the number of data values for the row areas corresponding to the boundary line portion of the second head 31(2) and the third head 31(3) may be set to three, which is more than that of the print example 2.

In other words, compared to the print example 2, while the number of data values is the same, the print example 3 can shorten a time for printing the correction patterns, and accordingly, the amounts of consumption of the ink and sheets can be reduced. However, the number of data values for the row areas corresponding to the nozzles located on both ends in the sheet width direction is smaller than that of the print example 2. As shown in the print example 2 and the print example 3, by changing the feed position of sheets on which the correction patterns are printed or the number of the sheets, the number of data values for the row areas for which the correction values H are needed to be accurately calculated can be increased.

Print Example 4 of Test Pattern

Figure 16A:
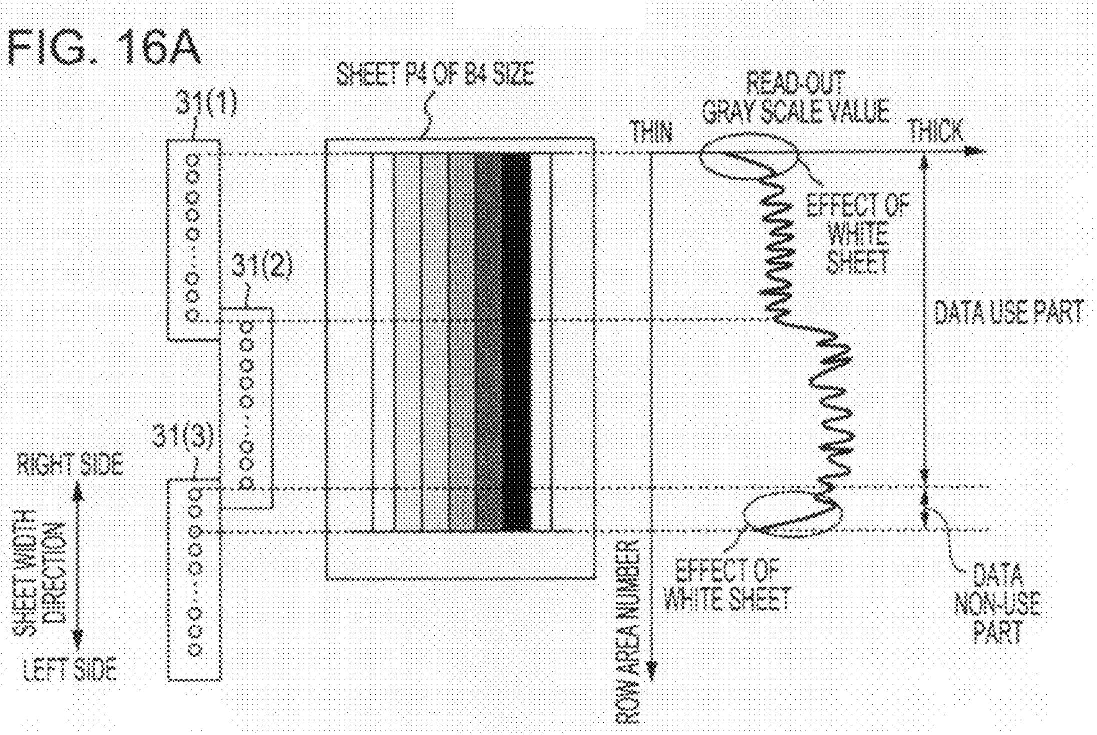
FIGS. 16A and 16B are diagrams showing a print example 4 of a test pattern.
Figure 16B:
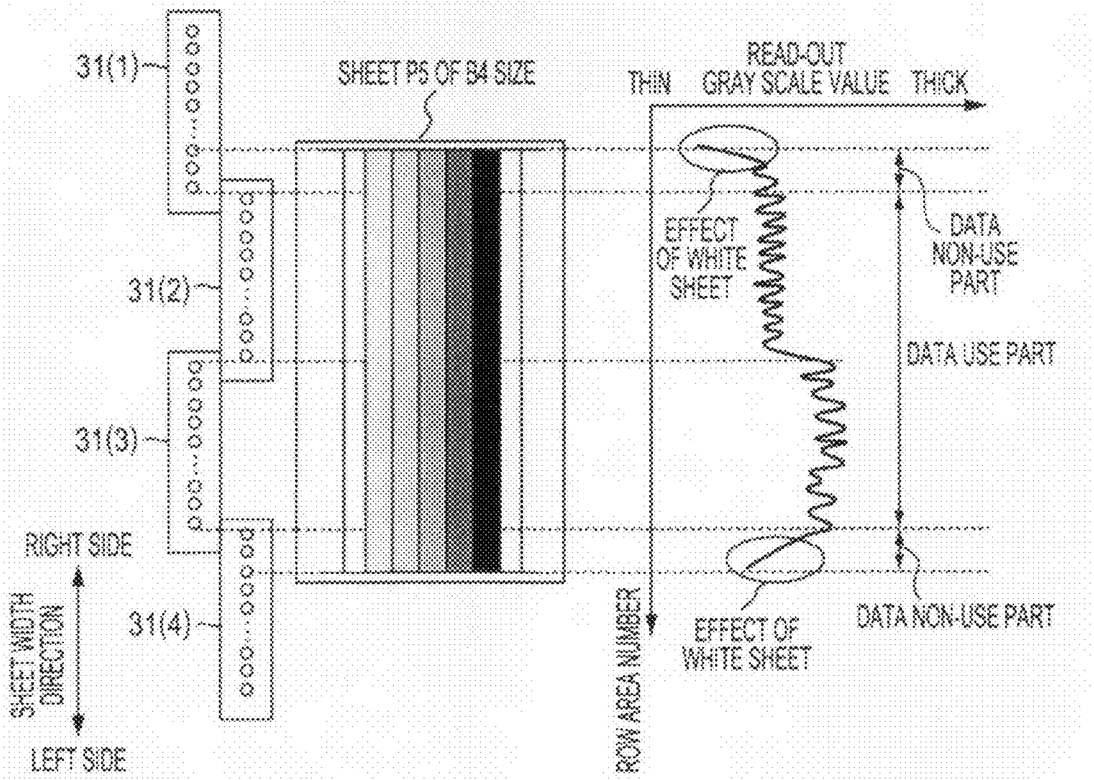

FIGS. 16A and 16B are diagrams showing a print example 4 of a test pattern. In this print example 4, correction patterns are printed on one sheet by using nozzles more than the number of nozzles used for printing the correction patterns on one sheet in the print example 1 (FIG. 9). In other words, in the print example 4, the correction pattern printed on one sheet is increased in size, compared to that in the print example 1. Accordingly, in the print example 4, the correction patterns are printed on a sheet of B4 size that is larger than the sheet of A4 size that is used in the print example 1.

For example, in order to acquire a read-out gray scale value of the first head and a read-out gray scale value of the second head, in the print example 1 (FIG. 9), the correction patterns are printed on a first sheet P1 by the first head 31(1) and the second head 31(2). On the other hand, in the print example 4 (FIG. 16A), the correction patterns are printed on a first sheet P4 by the first head 31(1), the second head 31(2), and nozzles that are located in the right end portion of the third head 31(3) (a first test pattern is formed by using the first nozzle group, the second nozzle group, and a nozzles that is located in an end portion of the third nozzle group on one side).

As shown in FIG. 11 described above, the read-out gray scale value of a row area located near the margin portion of the sheet may be influenced by the white background of the sheet so as to be visually recognized to have density thinner than the actual density. Accordingly, in the print example 1 (FIG. 9), the correction pattern formed by the nozzle located in the left end portion of the second head 31(2) may be influenced by the white background. On the other hand, in the print example 4 (FIG. 16A), the read-out gray scale value of the correction pattern that is formed by the right end portion of the third head 31(2) may be influenced by the white background. However, the read-out gray scale value of the correction pattern formed by the nozzle located in the left end portion of the second head 31(2) is stable data that is not influenced by the white background.

In other words, as in the print example 4, by allowing not only the nozzles (here, the first head 31(1) and the second head 31(2)) of which read-out gray scale values are needed but also nozzles in the vicinity thereof (here, the nozzles located in the right end portion of the third head 31(3)) to print the correction patterns, the influence of the white background on the needed data (read-out gray scale values) can be prevented. In other words, among the read-out results shown in FIG. 16A, the read-out gray scale values of the correction patterns formed by the first head 31(1) and the second head 31(2) are used, and the read-out gray scale value of the correction pattern formed by the right end portion of the third head 31(3) is not used.

FIG. 16B shows a correction pattern to be printed for a case where the read-out gray scale value of the second head and the read-out gray scale value of the third head are needed to be acquired. In such a case, the nozzles located in the left end portion of the first head 31(1), the second head 31(2), the third head 31(3), and the nozzle located in the right end portion of the fourth head 31(4) print the correction patterns. As a result, the read-out gray scale values of the correction patterns that are formed by nozzles located in the left end portion of the first head 31(1) and the nozzles located in the right end portion of the fourth head 31(4) may be influenced by the white background. However, the read-out gray scale value of the second head and the read-out gray scale value of the third head that are needed to be acquired show stable read-out results that are not influenced by the white background of the sheet. As described above, for heads 31 other than the heads 31(1) and 31(*n*) located on both ends in the sheet width direction, by allowing the nozzles of which the read-out gray scale values are needed to be acquired and the nozzles in the vicinity thereof to print the correction patterns, the influence of the white background of the sheet on the data (the read-out gray scale values) needed to be acquired can be prevented. As a result, the correction value H can be calculated more accurately.

In addition, as shown in FIGS. 16A and 16B, when only stable read-out gray scale values that are not influenced by the white background can be acquired, a process for excluding data that may be influenced by the white background for calculating the average gray scale value is omitted.

Weighted Average

Figure 17:
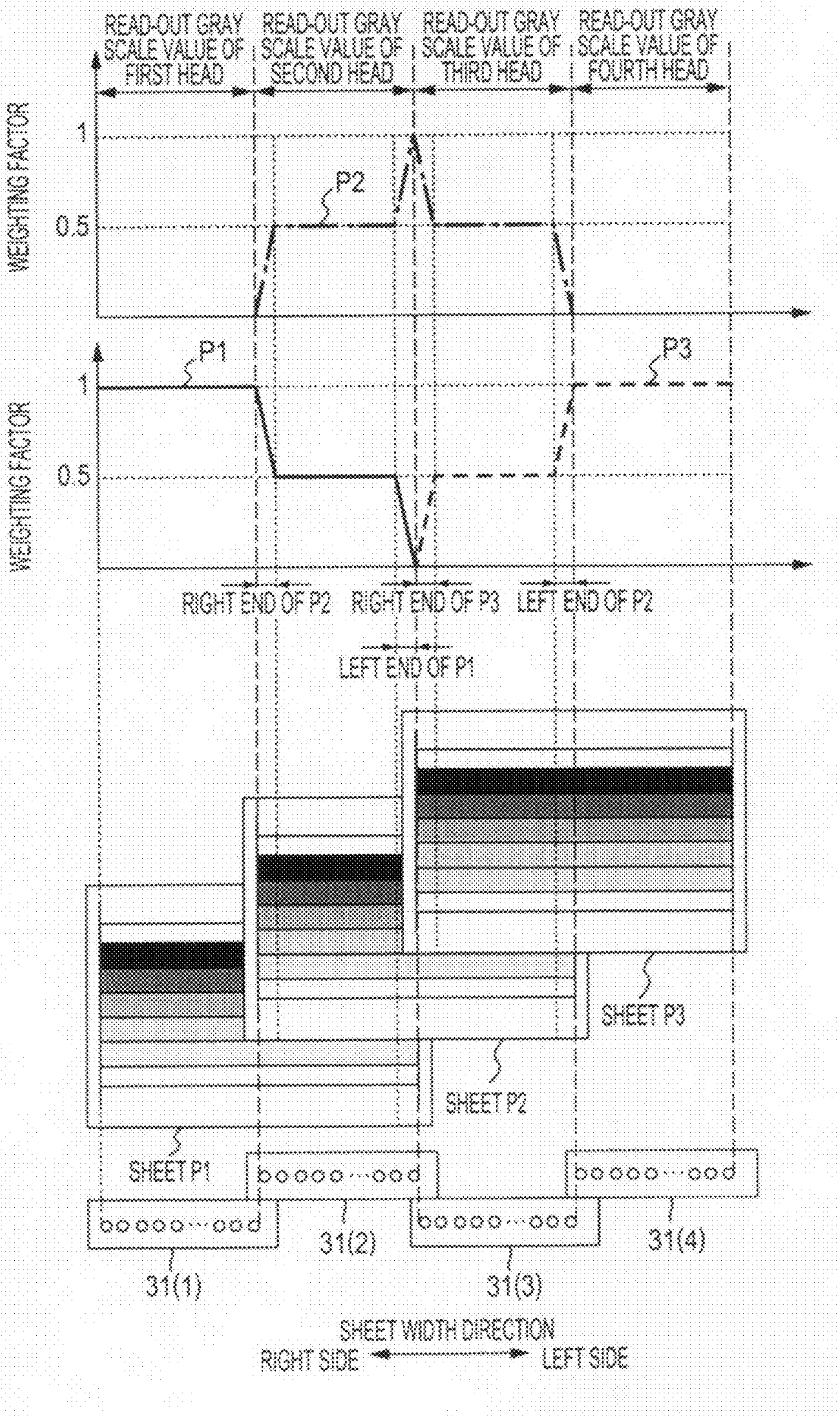
FIG. 17 is a diagram showing weighting factors.

FIG. 17 is a diagram showing weighting factors used for averaging the read-out result of the print example 1 of the test pattern by using the weighting factors. Until now, when a plurality of read-out gray scale values of correction patterns are acquired for one row area, an average value of the plurality of the read-out gray scale values is calculated, and the correction value H is calculated based on the average value. In order to calculate the correction value H having high accuracy, the average value is calculated by excluding the read-out gray scale values that may be influenced by the white background of the sheet. However, the invention is not limited thereto, and the read-out gray scale values that may be influenced by the white background of the sheet may be averaged by changing the weighting factors thereof so as to decrease the effects thereof. Then, the correction value H is calculated based on the weight-averaged gray scale values.

In FIG. 17, the weighting factors for performing a weighted averaging operation are shown. In the figure, weighting factors for the read-out results of the sheet P1 are denoted by solid lines, weighting factors for the read-out results of the sheet P2 are denoted by dashed-dotted lines, and weighting factors for the read-out results of the sheet P3 are denoted by dotted lines. First, as the read-out gray scale values of the first head, only the read-out results of the sheet P1 can be acquired. Accordingly, the weighting factor for the read-out result (first read-out gray scale value) of the correction patterns printed on the sheet P1 by the first head 31(1) is "1". In other words, for the row area corresponding to the first head 31(1), the read-out result of the sheet P1 is acquired as an averaged gray scale value by using weighting factors.

Next, as the read-out gray scale values of the second head, two read-out results including the read-out result of the sheet P1 and the read-out result of the sheet P2 are acquired. However, between the read-out results of the sheet P2, the read-out result of the correction pattern formed by the nozzle located in the right end portion of the second head 31(2) may be under the influence of the white background of the sheet. In addition, the read-out result of the row area adjacent to the margin of the sheet may be influenced the most by the white background of the sheet, and as a row area is located farther from the margin of the sheet, the read-out result for the row area is not likely to be influenced by the white background of the sheet.

Thus, for the row areas corresponding to the nozzles located in the right end portion of the second head 31(2), the weighting factors for the read-out result of the sheet P1 are gradually decreased, and the weighting factors for the read-out results of the sheet P2 are gradually increased. The weighted average value is a sum of integration values of the read-out results of the sheet P1 and the weighting factors corresponding thereto and integration values of the read-out results of the sheet P2 and the weighting factors corresponding thereto. Accordingly, when the weighting factor for the read-out result is small, the effect of the read-out result is decreased for calculating the weighted average. To the contrary, when the weighting factor for the read-out result is large, the effect of the read-out result is increased for calculating the weighted average. In other words, in the read-out result of the sheet P2, as a row area is located closer to the margin of the sheet, the degree of effect of the read-out result of the row area on the weighted average decreases. Accordingly, the read-out result that may be influenced by the white background of the sheet is not included in the average gray scale value, and whereby the correction value H can be calculated more accurately.

In addition, for row areas corresponding to the nozzles located in the left end portion of the second head 31(2), the read-out results of the sheet P1 may be under the influence of the white background of the sheet, and thus, the weighting factor for the read-out result of the sheet P1 is gradually decreased. To the contrary, the weighting factor for the read-out result of the sheet P2 is gradually increased. In addition, for the row areas corresponding to nozzles other than the nozzles located in both end portions of the second head 31(2), not only the read-out result of the sheet P1 but also the read-out result of the sheet P2 is not influenced by the white-background of the sheet and is stable a read-out result. Accordingly, the weighting factor (=0.5) for the read-out result of the sheet P1 and the weighting factor (=0.5) for the read-out result of the sheet P2 are the same. Similarly, for the read-out results of the sheet P3, as a row area is located closer to the margin of the sheet, the weighting factor for the read-out result of the row area is decreased.

As described above, by using the result of a weighted averaging operation by changing the weighting factor as the average gray scale value, an average gray scale value in which the read-out results of other sheets are included for many row areas as possible can be calculated, compared to a case where all the read-out results that may be under the influence of the white background of the sheet are excluded so as to calculate the average gray scale value. In other words, the correction values H for more row areas are calculated based on the read-out results in which the read-out error of the scanner is relieved, and accordingly, the non-uniformity of density is suppressed. Here, a method of weighted averaging for the print example 1 (FIG. 9) of the test pattern has been described. However, the weighted averaging operation may be performed for the read-out results of other test patterns including the print example 2 (FIG. 13) or the print example 3 (FIGS. 14 and 15).

S004: Method of Calculating Correction Value H

As described above, when the read-out gray scale value (average gray scale value) in which the read-out error of the scanner is relieved is calculated, the correction value H is calculated based on the read-out gray scale value (average gray scale value). For example, as shown in FIG. 10, in order to decrease the difference in the density for the row areas due to differences of characteristics of the heads and the nozzles, it is preferable that a difference in the density at a same gray scale value is relieved for each row area. In other words, by approaching the density of the row areas to a constant value, the non-uniformity of density is suppressed.

Thus, for a same directed gray scale value, for example, Sb, an average value Cbt of the read-out gray scale values for the whole row areas is set as a "target value Cbt". Then, the gray scale values of pixels corresponding to the row areas are corrected such that the read-out gray scale values for the directed gray scale value Sb approach the target value Cbt.

For an i-row area in which the read-out gray scale value Cbi for the directed gray scale value Sb is smaller than the target value Cbt, the gray scale value is corrected before a half-tone process and a density correcting process such that a printing operation is performed to be thicker than the setting of the directed gray scale value Sb. On the other hand, For a j-row area (Cbj) in which the read-out gray scale value is larger than the target value Cbt, the gray scale value is corrected such that a printing operation is performed to be thinner than the setting of the directed gray scale value Sb.

Figure 18A:
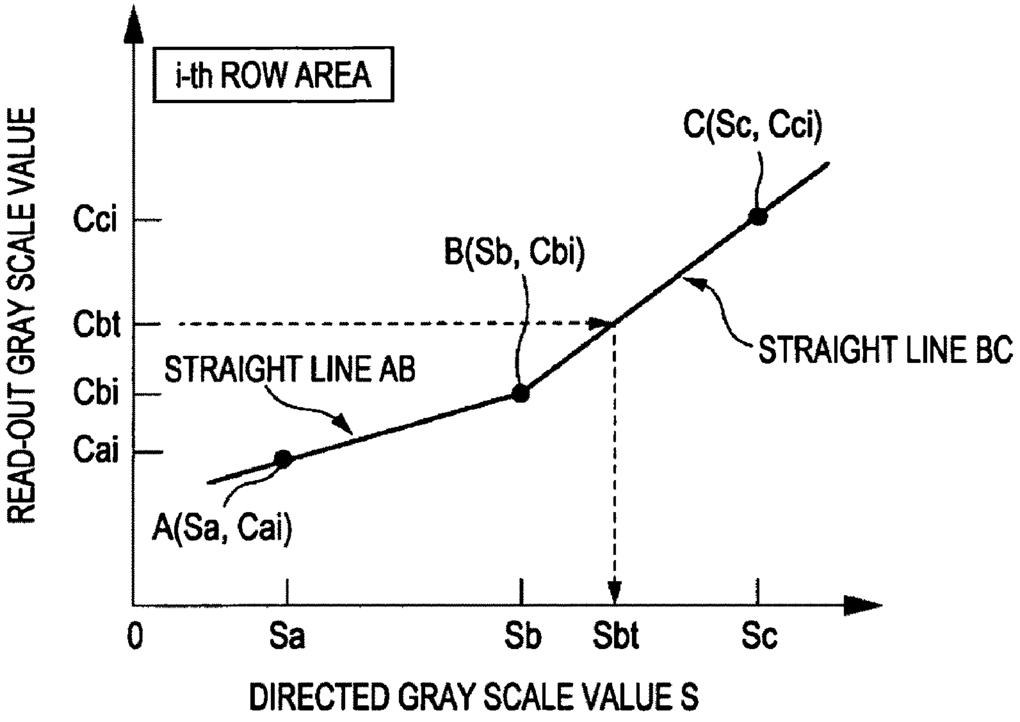
FIGS. 18A and 18B are diagrams showing a method of calculating a target gray scale value.

FIG. 18A is a diagram showing a method of calculating the target gray scale value Sbt for the i-th row area for which the read-out result is smaller than the target gray scale value Cbt. The horizontal axis represents a directed gray scale value, and the vertical axis represents a read-out gray scale value. On the graph, the read-out results (Cai, Cbi, Cci, Cdi, and Cei) of cyan of the i-th row area for the directed gray scale values (Sa, Sb, Sc, Sd, and Se) are plotted. A target directed gray scale value Sbt for the i-th row area to represent the target value Cbt for the directed gray scale value Sb is calculated by using the following equation (linear interpolation on the basis of a straight line BC).

$$Sbt=Sb+(Sc-Sb)\times[(Cbt-Cbi)/(Cci-Cbi)]$$

Figure 18B:
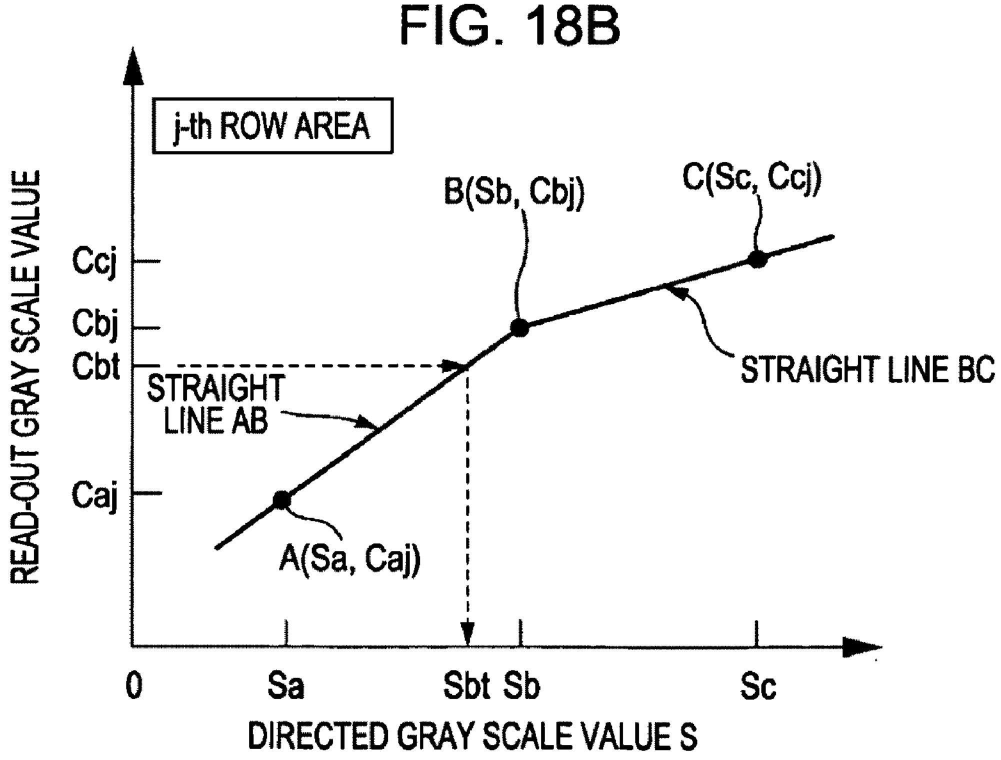

FIG. 18B is a diagram showing a method of calculating the target gray scale value Sbt for the j-th row area for which the read-out result is larger than the target gray scale value Cbt. On the graph, the read-out results of cyan of the j-th row area are plotted. A target directed gray scale value Sbt for the j-th row area to represent the target value Cbt for the directed gray scale value Sb is calculated by using the following equation (linear interpolation on the basis of a straight line AB).

$$Sbt=Sa+(Sb-Sa)\times[(Cbt-Caj)/(Cbj-Caj)]$$

As described above, after the target directed gray scale values Sbt for which density of each row area represents the target value Cbt are calculated for the directed gray scale value Sb, the correction values H for the directed gray scale value Sb of each row area are calculated by using the following equation.

$$Hb=(Sbt-Sb)/Sb$$

Similarly, five correction values (Ha, Hb, Hc, Hd, and He) for five directed gray scale values (Sa, Sb, Sc, Sd, and Se) are calculated for each row area. In addition, the correction values H of nozzle rows other than cyan are calculated.

S005: Storage of Correction Value H

FIG. 19 is a correction value table. After the correction values H are calculated, the correction values H are stored in a memory 13 of the printer 1. In the correction value table, five correction values (Ha_i, Hb_i, Hc_i, Hd_i, and He_i) for five directed gray scale values are assigned for each row area i. According to this embodiment, the correction values H are calculated for the number N (=180×n) of nozzles included in the printer 1.

Usage of User

In the manufacturing process of the printer 1, after the correction values H for correcting non-uniformity of density are calculated to be stored in the memory 13 of the printer, the printer 1 is shipped. Then, when a user installs the printer driver for using the printer 1, the printer driver requests the printer 1 to transmit the correction values H, which are stored in the memory 13, to the computer 50. The printer driver stores the correction values H, which are transmitted from the printer 1, in a memory mounted inside the computer 50.

Then, when receiving a print command from the user, the printer driver converts image data output from an application program into resolution for being printed on a sheet S by performing a resolution converting process. Next, the printer driver converts RGB data into CMYK data that is represented by a CMYK color space corresponding to ink of the printer 1 by performing a color converting process.

Thereafter, a gray scale value of a high gray scale that is represented by the pixel data is corrected by using the correction value H. The printer driver corrects the gray scale values (hereinafter, referred to as a gray scale value S_in before correction) of each pixel data based on the correction value H of a row area corresponding to the pixel data (hereafter, referred to as a gray scale value S_out after correction).

When the gray scale value S_in before correction is the same as any of Sa, Sb, Sc, Sd, and Se, the correction values Ha, Hb, Hc, Hd, and He that are stored in the memory of the computer 50 can be directly used. For example, when the gray scale value before correction S_in=Sc, the gray scale value after correction S_out is acquired by using the following equation.

$$S\_out=Sc\times(1+Hc)$$

Figure 20:
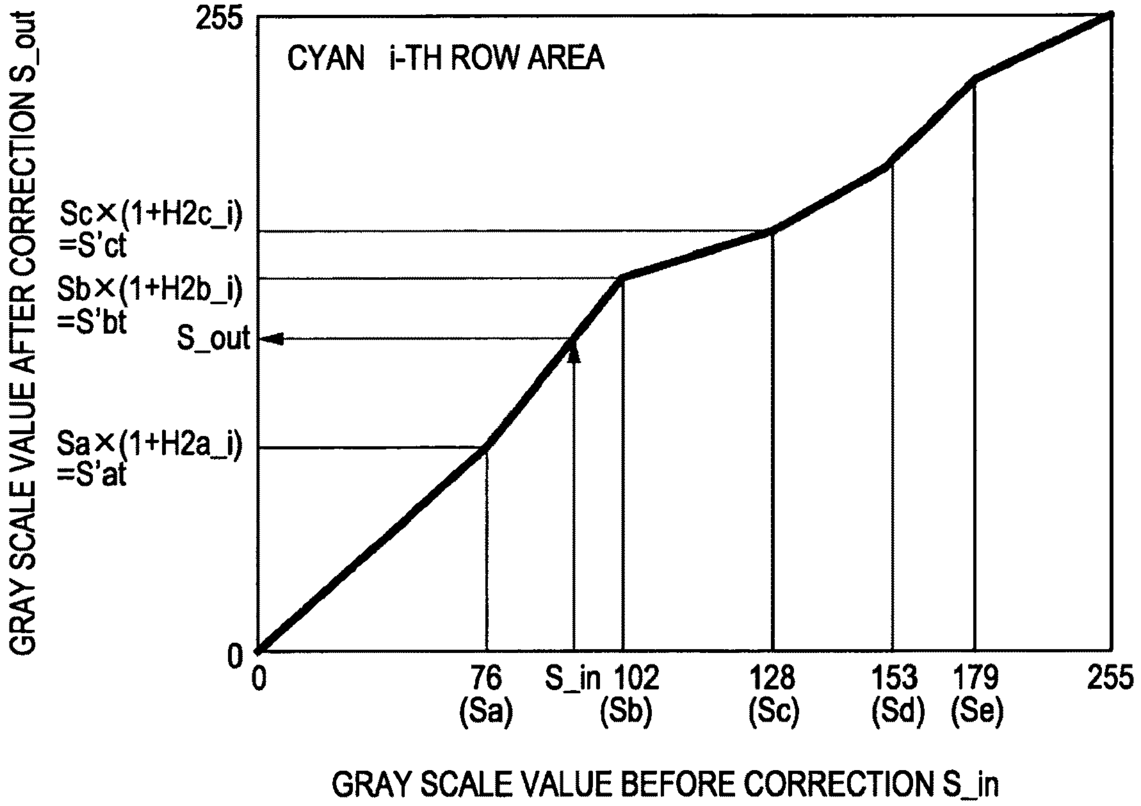
FIG. 20 is a diagram showing a method of correcting the gray scale value before correction.

FIG. 20 is a diagram showing a correction method for a case where the gray scale value before correction S_in of i-th row area of cyan is different from the directed gray scale values. The horizontal axis represents a gray scale value before correction S_in, and the vertical axis represents a gray scale value after correction S_out. When the gray scale value before correction S_in is between the directed gray scale values Sa and Sb, the gray scale value after correction S_out is calculated based on a correction value Ha of the directed gray scale value Sa and a correction value Hb of the directed gray scale value Sb through linear interpolation by using the following equation.

$$S\_out=Sa+(S'bt-S'at)\times[(S\_in-Sa)/(Sb-Sa)]$$

In addition, when the gray scale value before correction S_in is smaller than the directed gray scale value Sa, the gray scale value after correction S_out is calculated by performing linear interpolation of the gray scale value of “0” (minimum gray scale value) and the directed gray scale value Sa. On the other hand, when the gray scale value before correction S_in is larger than the directed gray scale value Sc, the gray scale value after correction S_out is calculated by performing linear interpolation of the gray scale value of “255” (maximum gray scale value) and the directed gray scale value Sc. The correction method is not limited thereto, and it may be configured that a correction value H_out corresponding to the gray scale value before correction S_in other than the directed gray scale value is calculated, and the gray scale value after correction S_out is calculated (S_out=S_in×(1+H_out).

After performing a density correcting process for each row area as described above, data of the high gray scale number is converted into data of a gray scale number that can be formed by the printer 1 by performing a half-tone process. Finally, by performing a rasterizing process, the image data in the form of a matrix can be arranged and changed in the order of data to be transmitted to the printer 1 for each pixel data. The print data generated through the above-described process is transmitted to the printer 1 together with command data (transport amount or the like) corresponding to the print mode by the printer driver.

Method of Calculating Correction Value: Second Embodiment

Figure 21A:
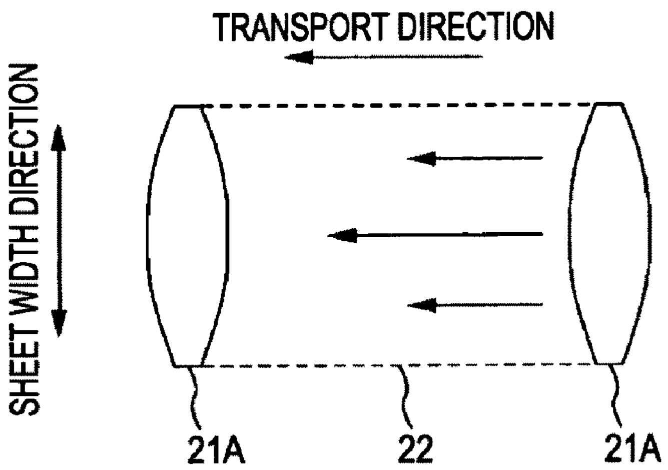
FIG. 21A is a top view of transport rollers.

FIG. 21A is a top view of transport rollers 21A and 21B. The printer 1 according to this embodiment, as shown in FIG. 2B, transports a sheet by using the transport belt 22 and the transport rollers 21A and 21B. In particular, the transport belt 22 of a printer that prints a large-sized sheet may be easily bent. Accordingly, as shown in FIG. 21A, the center portions of the transport rollers 21A and 21B are formed to be thick so as to apply tension to the transport belt 22. In such a case, a speed difference is generated between the center portion and the end portion in the sheet width direction on the transport belt 22. Thus, the center portion in the sheet width direction tends to have speed higher than that of the end portion. At this moment, when a sheet is not fed with the center portion of the transport belt 22 in the sheet width direction used as a reference, the sheet may be inclined during the transport process.

Figure 21B:
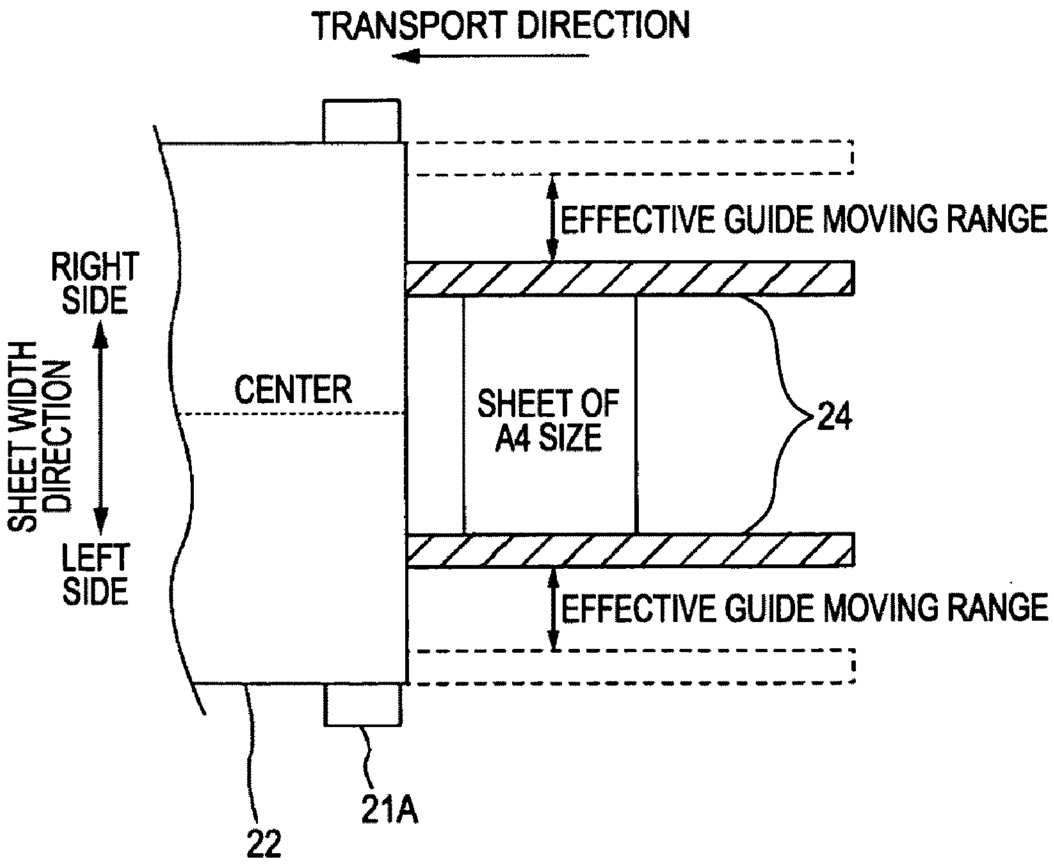
FIG. 21B is a diagram showing a transport guide.

FIG. 21B is a diagram showing transport guides 24 for transporting a sheet to a print area. A sheet is fed to the transport belt 22 along the transport guides 24 disposed on left and right sides in the sheet width direction, and whereby the sheet is fed without being inclined. When the transport guides 24 move with the center portion of the transport belt 22 in the sheet width direction used as the reference, a small-sized sheet (for example, a sheet of A4 size) cannot be moved and fed to the right end of the transport belt 22.

In the above-described first embodiment, for a printer that prints a large-sized sheet (for example, a sheet of A2 size) exceeding the read-out range of the scanner, the correction patterns are printed into small-sized sheets (for example, sheets of A4 size) by several times. In the first embodiment in which the correction patterns are printed in small-sized sheets, for example, as shown in FIG. 9, the sheet is needed to be moved to the right or left side of the transport belt 22. Accordingly, as a printer shown in FIG. 21, a printer of a type in which a sheet is fed with the center portion of the transport belt 22 used as the reference cannot print the correction patterns on a small-sized sheet.

Thus, according to the second embodiment, first, the test patterns are printed on a sheet of a size that can be printed by the printer, even when the size exceeds the read-out range of the scanner. Thereafter, the sheet is cut into sheets of a size that can be read by the scanner. Accordingly, the test patterns printed by the printer as shown in FIG. 20 can be read by the scanner.

Figure 22:
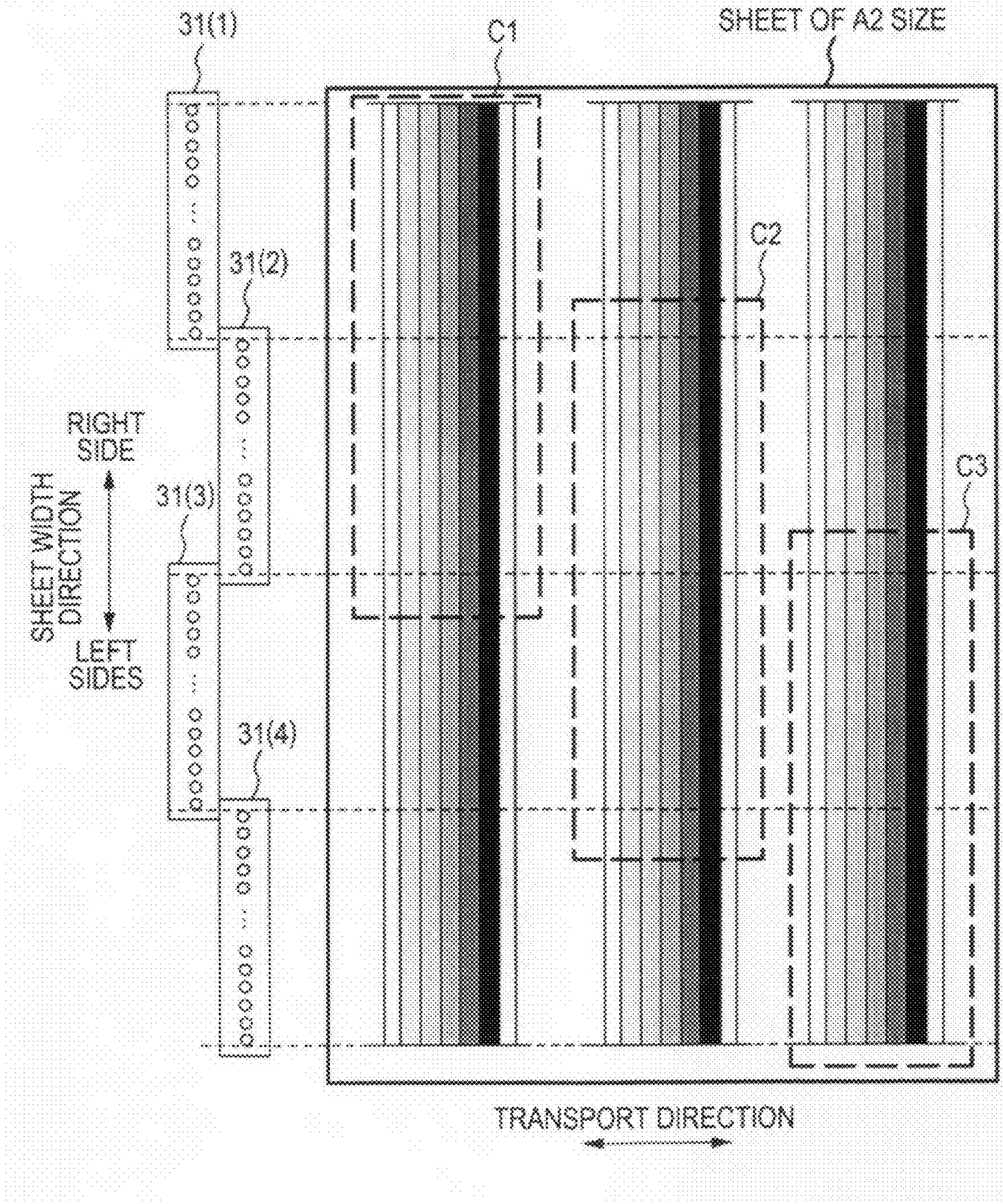
FIG. 22 is a diagram showing cutting positions of a correction pattern.

FIG. 22 is a diagram showing the cutting positions of the correction patterns printed on a sheet of A2 size by the printer 1. First, the correction patterns are printed so as to fill out a sheet of A2 size by using all the heads 31(1) to 31(4). For the convenience of description, the number of heads to be drawn is reduced. Three correction patterns printed on the sheet of A2 size shown in FIG. 21 are formed by using a same (color) nozzle row. Thereafter, in order to acquire read-out gray scale values of the correction patterns printed by the first head 31(1) and the second head 31(2), the correction patterns are cut from the sheet of A2 size in the cutting position C1 (dotted line) shown in FIG. 22. At this moment, the correction pattern is needed to be cut so as to assuredly include a row area printed by the leftmost nozzle of the second head 31(2). Accordingly, a large range C1 is cut so as to include a correction pattern that is formed by a nozzle located in the right end portion of the third head 31(3). By reading the cut sheet C'1 that is cut in the cutting position C1 by using the scanner, the read-out gray scale values of the correction patterns that are formed by the first head 31(1) and the second head 31(2) can be acquired. In addition, in the cutting position C1, the correction pattern that is formed by the nozzle located in the right end portion of the third head 31(3) is included. Accordingly, the influence of the margin of the sheet on the read-out result of the correction pattern that is formed by the nozzle located in the left end portion of the second head 31(2) can be prevented.

Next, in order to acquire the read-out gray scale values of the correction patterns printed by the second head 31(2) and the third head 31(3), the correction pattern is cut in a cutting position C2 from the sheet of A2 size. At this moment, by cutting the sheet so as to include correction patterns printed by a nozzle located in the left end portion of the first head 31(1) and a nozzle located in the right end portion of the fourth head 31(4), the influence of the margin of the sheet on the read-out gray scale values of the second head and the read-out gray scale values of the third head can be prevented.

In addition, the correction pattern printed by the second head 31(2) is included in both the cutting position C1 and the cutting position C2. As a result, an "eighth read-out gray scale value" that is the read-out result of the correction pattern printed in a cutting sheet C'1 by the second head 31(2) and a "ninth read-out gray scale value" that is the read-out result of the correction pattern printed in the cutting sheet C'2 by the second head 31(2) can be acquired as a read-out gray scale value of the second head. Then, by calculating the correction value H based on an average value of the eighth read-out gray scale value and the ninth read-out gray scale value, the correction value H in which the read-out error of the scanner is relieved can be calculated. Accordingly, non-uniformity of density can be suppressed.

Similarly, in order to acquire the read-out gray scale values of the correction patterns printed by the third head 31(3) and the fourth head 31(4), the correction pattern is cut in a cutting position C3 from the sheet of A2 size. By having the correction pattern printed by the third head 31(3) included in both the cutting position C2 and the cutting position C3, the correction value H in which the read-out error of the scanner is relieved can be calculated.

In other words, according to the second embodiment, when the correction patterns printed in a sheet of a size larger than the read-out range of the scanner is cut, it is configured that the correction pattern printed by any nozzle or any head 31 is cut so as to be included in both sides of the cut sheets that are not simultaneously read by the scanner. Then, by calculating the correction value H based on the average gray scale value that is an average value of a plurality of read-out gray scale values, the read-out error of the scanner can be relieved, and thereby non-uniformity of density can be resolved. In addition, in FIG. 22, the correction patterns are printed so as to fill out the surface of the sheet of A2 size. However, it is preferable that the correction patterns are printed in the range of the cutting positions C1 to C3.

Other Embodiments

In the above-described embodiment, a printing system having an ink jet printer has been mainly described. However, disclosure of a method of suppressing the non-uniformity of density and the like is included therein. The above-described embodiments are for easy understanding of the invention and are not for the purpose of limiting the invention. It is apparent that the invention may be changed or modified without departing from the gist of the invention, and equivalents thereof belong to the scope of the invention. In particular, embodiments described below also belong to the scope of the invention.

Liquid Discharging Device

In the above-described embodiments, as a liquid discharging device (a part) that performs a method of discharging liquid, an ink jet printer has been described as an example. However, the invention is not limited thereto. The liquid discharging device may be applied to various industrial apparatuses other than a printer (printing device). For example, the invention may be applied to a coloring device for attaching shapes to a cloth, a display manufacturing apparatus such as a color filter manufacturing apparatus or an organic EL display, a DNA chip manufacturing apparatus that manufactures a DNA chip by coating a solution into which DNA is melt, a circuit board manufacturing apparatus, and the like.

In addition, a liquid discharging type may be a piezo type in which liquid is discharged by applying a voltage to a driving element (piezo element) so as to expand or contract an ink chamber or a thermal type in which air bubbles are generated inside a nozzle by using a heating element and liquid is discharged by using the air bubbles.

Printer

In the above-described embodiments, a line head printer is exemplified in which nozzles are aligned in the sheet width direction interesting the transport direction of a medium. However, the invention is not limited thereto. For example, a printer in which a dot forming operation for forming a dot row along the moving direction and a transport operation (moving operation) for transporting a sheet in the transport direction that is the nozzle row direction are repeated while a head unit is moved in the moving direction intersecting the nozzle row direction may be used. In a case where the test patterns printed by the printer is larger than the read-out range of the scanner, when at least one nozzle prints test patterns on two media that are not simultaneously read by the scanner, the read-out error of the scanner can be resolved.

In addition, in the printer, in a band printing process in which after a band image is printed by one movement (pass) of the head unit, a sheet is transported by a length corresponding to the band image, and a band image is printed again, a raster line formed by a pass is not printed between raster lines formed by another pass. Accordingly, same as in the above-described line head printer, between raster lines formed by a head, a raster line formed by another head is not formed. However, in an interlaced printing process in which, between the raster line recorded by one pass, a raster line that is not recorded by the pass is interlaced, between raster lines formed by a head, a raster line is formed by another head. Even in such a case, for example, when a test pattern that is configured by a first dot row group, a second dot row group, and a third dot row group is printed in several sheets of a smaller size (or after the test pattern is printed on a large-sized sheet, the sheet is cut), the second dot group is configured to be included in both sheets that are not simultaneously read by the scanner. Accordingly, the correction value H can be calculated based on the average value of the read-out results of the second nozzle group that are not simultaneously read by the scanner, and whereby the correction value H in which the read-out error of the scanner is relieved can be calculated.

Head 31

In the above-described embodiments, as shown in FIG. 3, a line head printer in which a plurality of heads 31 is aligned along the sheet width direction has been described as an example. However, the invention is not limited thereto. For example, a printer having one head that includes a long nozzle row in the sheet width direction may be used. When the test pattern formed by the long nozzle row in the sheet width direction exceeds the read-out range of the scanner, it is preferable that the test patterns are printed with the nozzle row divided into a plurality of nozzle groups. In such a case, for two media that are not simultaneously read by the scanner, when at least one nozzle prints test patterns on the two media, the read-out error of the scanner can be resolved.

What is claimed is:

1. A method of calculating a correction value, the method comprising:

forming a first test pattern on a medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group;

forming a second test pattern on the medium by using the second nozzle group and the third nozzle group of the liquid discharging device;

setting the first test pattern in a scanner, acquiring a read-out result of a portion formed by the first nozzle group from a read-out result of the first test pattern as a first read-out gray scale value, and acquiring a read-out result of a portion formed by the second nozzle group from a read-out result of the first test pattern as a second read-out gray scale value;

setting the second test pattern other than the first test pattern in the scanner, acquiring a read-out result of a portion formed by the second nozzle group from a read-out result of the second test pattern as a third read-out gray scale value, and acquiring a read-out result of a portion formed by the third nozzle group from a read-out result of the second test pattern as a fourth read-out gray scale value;

calculating an average gray scale value that is an average value of the second read-out gray scale value and the third read-out gray scale value; and calculating a correction value of the second nozzle group based on the average gray scale value;

wherein the first nozzle group, the second nozzle group, and the third nozzle group are aligned in the described order from one side in the predetermined direction, and wherein, in the calculating of an average gray scale value, an average value of the second read-out gray scale value, from which the read-out result of the first test pattern formed by the nozzle of the second nozzle group that is located in an end portion on the other side is excluded, and the third read-out gray scale value, from which the read-out result of the second test pattern formed by the nozzle of the second nozzle group that is located in an end portion on the one side is excluded, is calculated as the average gray scale value.

2. A method of calculating a correction value, the method comprising:

forming a first test pattern on a. medium by using a first nozzle group and a second nozzle group of a liquid discharging device including a nozzle row, in which a plurality of nozzles for discharging liquid is aligned in a predetermined direction, having the first nozzle group, the second nozzle group, and a third nozzle group;

forming a second test pattern on the medium by using the second nozzle group and the third nozzle group of the liquid discharging device;

setting the first test pattern in a scanner, acquiring a read-out result of a portion formed by the first nozzle group from a read-out result of the first test pattern as a first read-out gray scale value, and acquiring a read-out result of a portion formed by the second nozzle group from a read-out result of the first test pattern as a second read-out gray scale value;

setting the second test pattern other than the first test pattern in the scanner, acquiring a read-out result of a portion formed by the second nozzle group from a read-out result of the second test pattern as a third read-out gray scale value, and acquiring a read-out result of a portion formed by the third nozzle group from a read-out result of the second test pattern as a fourth read-out gray scale value;

calculating an average gray scale value that is an average value of the second read-out gray scale value and the third read-out gray scale value; and calculating a correction value of the second nozzle group based on the average gray scale value;

wherein the first nozzle group, the second nozzle group, and the third nozzle group are aligned in the described order from one side in the predetermined direction, wherein, in the calculating of an average gray scale value, weighting factors are set such that as a nozzle of the second nozzle group is located closer to the end portion on the other side, a weighting factor for the read-out result of the first test pattern that is formed by the nozzle becomes larger and as a nozzle of the second nozzle group is located closer to the end portion on the one side, a weighting factor for the read-out result of the second test pattern that is formed by the nozzle becomes smaller, and wherein an average value acquired by weighted-averaging the second read-out gray scale value and the third read-out gray scale value is calculated as the average gray scale value based on the weighting factors.

3. The method according to claim 1, wherein the first nozzle group, the second nozzle group, and the third nozzle group are aligned in the described order from one side in the predetermined direction, wherein the first test pattern is formed on the medium by using the first nozzle group, the second nozzle group, and the nozzle of the third nozzle group that is located in the end portion on one side, and wherein the second test pattern is formed on the medium by using the nozzle of the first nozzle group that is located in the end portion on the other side, the second nozzle group, and the third nozzle group.

4. The method according to claim 1, wherein a plurality of the first read-out gray scale values and a plurality of the second read-out gray scale values are acquired by forming a plurality of the first test patterns, wherein a plurality of the third read-out gray scale values and a plurality of the fourth read-out gray scale values are acquired by forming a plurality of the second test patterns, wherein, in the calculating of an average gray scale value, an average value of the plurality of the second read-out gray scale values and the plurality of the third read-out gray scale values is calculated as the average gray scale value; and wherein, in the calculating of a correction value, the correction value of the first nozzle group is calculated based on the plurality of the first read-out gray scale values, the correction value of the second nozzle group is calculated based on the average gray scale value, and the correction value of the third nozzle group is calculated based on the plurality of the fourth gray scale values.

5. The method according to claim 1, wherein the first nozzle group, the second nozzle group, and the third nozzle group are aligned in the described order from one side in the predetermined direction, and the method further comprising forming a third test pattern on the medium by using the nozzle of the second nozzle group that is located on the other side and the third nozzle group, wherein, in the calculating of a correction value, the correction value of the first nozzle group is calculated based on the first read-out gray scale value, the correction value of the nozzle of the second nozzle group that is located on the one side other than the nozzle located on the other side is calculated based on the average gray scale value corresponding to the nozzle on the one side, and the correction value of the nozzle on the other side is calculated based on the average gray scale value corresponding to the other nozzle and the read-out result of the third test pattern corresponding to the other nozzle.

6. The method according to claim 2, wherein the first nozzle group, the second nozzle group, and the third nozzle group are aligned in the described order from one side in the predetermined direction, wherein the first test pattern is formed on the medium by using the first nozzle group, the second nozzle group, and the nozzle of the third nozzle group that is located in the end portion on one side, and wherein the second test pattern is formed on the medium by using the nozzle of the first nozzle group that is located in the end portion on the other side, the second nozzle group, and the third nozzle group.

7. The method according to claim 2, wherein a plurality of the first read-out gray scale values and a plurality of the second read-out gray scale values are acquired by forming a plurality of the first test patterns, wherein a plurality of the third read-out gray scale values and a plurality of the fourth read-out gray scale values are acquired by forming a plurality of the second test patterns, wherein, in the calculating of an average gray scale value, an average value of the plurality of the second read-out gray scale values and the plurality of the third read-out gray scale values is calculated as the average gray scale value; and wherein, in the calculating of a correction value, the correction value of the first nozzle group is calculated based on the plurality of the first read-out gray scale values, the correction value of the second nozzle group is calculated based on the average gray scale value, and the correction value of the third nozzle group is calculated based on the plurality of the fourth gray scale values.

8. The method according to claim 2, wherein the first nozzle group, the second nozzle group, and the third nozzle group are aligned in the described order from one side in the predetermined direction, and the method further comprising forming a third test pattern on the medium by using the nozzle of the second nozzle group that is located on the other side and the third nozzle group, wherein, in the calculating of a correction value, the correction value of the first nozzle group is calculated based on the first read-out gray scale value, the correction value of the nozzle of the second nozzle group that is located on the one side other than the nozzle located on the other side is calculated based on the average gray scale value corresponding to the nozzle on the one side, and the correction value of the nozzle on the other side is calculated based on the average gray scale value corresponding to the other nozzle and the read-out result of the third test pattern corresponding to the other nozzle.

* * * * *